US009912482B2

(12) United States Patent
Burbank et al.

(10) Patent No.: US 9,912,482 B2
(45) Date of Patent: *Mar. 6, 2018

(54) METHODS AND APPARATUS TO COLLECT DISTRIBUTED USER INFORMATION FOR MEDIA IMPRESSIONS AND SEARCH TERMS

(71) Applicant: The Nielsen Company (US), LLC, New York, NY (US)

(72) Inventors: John R. Burbank, New York, NY (US); Madhusudhan Reddy Alla, Allen, TX (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/959,990

(22) Filed: Dec. 4, 2015

(65) Prior Publication Data

US 2016/0087799 A1  Mar. 24, 2016

Related U.S. Application Data

(63) Continuation of application No. 14/562,319, filed on Dec. 5, 2014, now Pat. No. 9,210,130, which is a (Continued)

(30) Foreign Application Priority Data

Apr. 12, 2013  (AU) .............................. 2013204953

(51) Int. Cl.
  *H04L 29/06* (2006.01)
  *H04L 9/32* (2006.01)
  (Continued)

(52) U.S. Cl.
  CPC ...... *H04L 9/3244* (2013.01); *G06F 17/30864* (2013.01); *G06F 21/6245* (2013.01);
  (Continued)

(58) Field of Classification Search
  CPC ... H04L 9/3244; H04L 51/32; H04L 63/0414; H04L 63/0428; H04L 67/22;
  (Continued)

(56) References Cited

U.S. PATENT DOCUMENTS 3,540,003 A    11/1970 Murphy
3,818,458 A    6/1974 Deese
(Continued)

FOREIGN PATENT DOCUMENTS

AU    2013205736    5/2013
AU    2015230772    10/2015
(Continued)

OTHER PUBLICATIONS

Coffey, "Internet Audience Measurement: A Practitioner's View," Journal of Interactive Advertising, vol. 1, No. 2, Spring 2001, pp. 10-17.
(Continued)

*Primary Examiner* — Michael S McNally
(74) *Attorney, Agent, or Firm* — Hanley, Flight & Zimmerman, LLC

(57) ABSTRACT

Disclosed examples involve obtaining encrypted identifiers identifying at least one of a device or a user of the device, sending respective ones of the encrypted identifiers to corresponding database proprietors, receiving user information corresponding to the respective ones of the encrypted identifiers from the corresponding database proprietors, and associating the user information with at least one of a search term collected at the device or a media impression logged for media presented at the device.

23 Claims, 15 Drawing Sheets

Related U.S. Application Data continuation of application No. 14/127,414, filed as application No. PCT/US2013/057045 on Aug. 28, 2013, now Pat. No. 8,930,701.

(60) Provisional application No. 61/697,597, filed on Sep. 6, 2012, provisional application No. 61/695,169, filed on Aug. 30, 2012.

(51) Int. Cl.

| | |
|---|---|
| G06F 17/30 | (2006.01) |
| G06F 21/62 | (2013.01) |
| G06Q 50/00 | (2012.01) |
| H04L 12/58 | (2006.01) |
| H04L 29/08 | (2006.01) |
| H04W 12/02 | (2009.01) |

(52) U.S. Cl.
CPC ............ *G06Q 50/01* (2013.01); *H04L 51/32* (2013.01); *H04L 63/0414* (2013.01); *H04L 63/0428* (2013.01); *H04L 67/22* (2013.01); *H04W 12/02* (2013.01); *G06F 2221/2101* (2013.01); *G06F 2221/2107* (2013.01); *G06F 2221/2135* (2013.01)

(58) Field of Classification Search
CPC ............ H04W 12/02; G06F 17/30864; G06F 21/6245; G06C 50/01
USPC ........................................................ 713/176
See application file for complete search history.

(56) References Cited

U.S. PATENT DOCUMENTS

| | | |
|---|---|---|
| 3,906,450 A | 9/1975 | Prado, Jr. |
| 3,906,454 A | 9/1975 | Martin |
| T955,010 I4 | 2/1977 | Ragonese et al. |
| 4,168,396 A | 9/1979 | Best |
| 4,230,990 A | 10/1980 | Lert, Jr. et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Lofberg |
| 4,658,093 A | 4/1987 | Hellman |
| 4,672,572 A | 6/1987 | Alsberg |
| 4,685,056 A | 8/1987 | Barnsdale, Jr. et al. |
| 4,696,034 A | 9/1987 | Wiedemer |
| 4,703,324 A | 10/1987 | White |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,956,769 A | 9/1990 | Smith |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,113,518 A | 5/1992 | Durst, Jr. et al. |
| 5,182,770 A | 1/1993 | Medveczky et al. |
| 5,204,897 A | 4/1993 | Wyman |
| 5,214,780 A | 5/1993 | Ingoglia et al. |
| 5,233,642 A | 8/1993 | Renton |
| 5,283,734 A | 2/1994 | Von Kohorn |
| 5,287,408 A | 2/1994 | Samson |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,483,658 A | 1/1996 | Grube et al. |
| 5,497,479 A | 3/1996 | Hornbuckle |
| 5,499,340 A | 3/1996 | Barritz |
| 5,584,050 A | 12/1996 | Lyons |
| 5,594,934 A | 1/1997 | Lu et al. |
| 5,675,510 A | 10/1997 | Coffey et al. |
| 5,793,409 A | 8/1998 | Tetsumura |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,164,975 A | 12/2000 | Weingarden et al. |
| 6,223,215 B1 | 4/2001 | Hunt et al. |
| 6,247,050 B1 | 6/2001 | Tso et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,127,305 B1 | 10/2006 | Palmon |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,257,546 B2 | 8/2007 | Ebrahimi et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,323,991 B1 | 1/2008 | Eckert et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,444,388 B1 | 10/2008 | Svendsen |
| 7,526,538 B2 | 4/2009 | Wilson |
| 7,546,370 B1 | 6/2009 | Acharya et al. |
| 7,590,568 B2 | 9/2009 | Blumenau |
| 7,593,576 B2 | 9/2009 | Meyer et al. |
| 7,600,014 B2 | 10/2009 | Russell et al. |
| 7,613,635 B2 | 11/2009 | Blumenau |
| 7,634,786 B2 | 12/2009 | Knee et al. |
| 7,644,156 B2 | 1/2010 | Blumenau |

(56) References Cited

U.S. PATENT DOCUMENTS

| | | |
|---|---|---|
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,032,626 B1 | 10/2011 | Russell et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,117,193 B2 | 2/2012 | Svendsen et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,151,291 B2 | 4/2012 | Ramaswamy |
| 8,180,112 B2 | 5/2012 | Kurtz et al. |
| 8,229,458 B2 | 7/2012 | Busch |
| 8,229,780 B2 | 7/2012 | Davidow et al. |
| 8,234,408 B2 | 7/2012 | Jungck |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |
| 8,307,006 B2 | 11/2012 | Hannan et al. |
| 8,307,458 B2 | 11/2012 | Kasahara et al. |
| 8,370,489 B2 | 2/2013 | Mazumdar et al. |
| 8,387,084 B1 | 2/2013 | Klappert et al. |
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,495,198 B2 | 7/2013 | Sim et al. |
| 8,504,411 B2 | 8/2013 | Subasic et al. |
| 8,504,507 B1 | 8/2013 | Srinivasaiah |
| 8,514,907 B2 | 8/2013 | Wright et al. |
| 8,543,454 B2 | 9/2013 | Fleischman et al. |
| 8,549,552 B2 | 10/2013 | Ramaswamy et al. |
| 8,600,796 B1 | 12/2013 | Sterne et al. |
| 8,626,084 B2 | 1/2014 | Chan et al. |
| 8,631,122 B2 | 1/2014 | Kadam et al. |
| 8,688,524 B1 | 4/2014 | Ramalingam et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,898,689 B2 | 11/2014 | Georgakis |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,083,853 B2 | 7/2015 | Shkedi |
| 9,106,709 B2 | 8/2015 | Desilva et al. |
| 9,117,217 B2 | 8/2015 | Wilson et al. |
| 9,210,130 B2 | 12/2015 | Burbank et al. |
| 9,218,612 B2 | 12/2015 | Mazumdar et al. |
| 9,237,138 B2 | 1/2016 | Bosworth et al. |
| 9,301,007 B2 | 3/2016 | Ramaswamy |
| 2002/0099609 A1 | 7/2002 | Nascenzi et al. |
| 2002/0128925 A1 | 9/2002 | Angeles |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0044768 A1 | 3/2004 | Takahashi |
| 2004/0088212 A1 | 5/2004 | Hill |
| 2004/0098229 A1 | 5/2004 | Error et al. |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dettinger et al. |
| 2005/0033657 A1 | 2/2005 | Herrington et al. |
| 2005/0166233 A1 | 7/2005 | Beyda et al. |
| 2005/0223093 A1 | 10/2005 | Hanson et al. |
| 2005/0262573 A1 | 11/2005 | Bo et al. |
| 2005/0267799 A1 | 12/2005 | Chan et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0184617 A1 | 8/2006 | Nicholas et al. |
| 2006/0190616 A1 | 8/2006 | Mayerhofer et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0124429 A1 | 5/2007 | Kikkoji et al. |
| 2007/0156532 A1 | 7/2007 | Nyhan et al. |
| 2007/0198327 A1 | 8/2007 | Yazdani et al. |
| 2007/0208711 A1 | 9/2007 | Rhoads et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2007/0300309 A1 | 12/2007 | Naito |
| 2008/0004958 A1 | 1/2008 | Ralph et al. |
| 2008/0086356 A1 | 4/2008 | Glassman et al. |
| 2008/0086523 A1 | 4/2008 | Afergan et al. |
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1* | 10/2008 | Busch .................. H04W 4/02 455/456.5 |
| 2008/0259906 A1 | 10/2008 | Shkedi |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0089420 A1 | 4/2009 | Caruso et al. |
| 2009/0125934 A1 | 5/2009 | Jones et al. |
| 2009/0171762 A1 | 7/2009 | Alkove et al. |
| 2009/0217315 A1 | 8/2009 | Malik et al. |
| 2009/0254633 A1 | 10/2009 | Olive |
| 2009/0292587 A1 | 11/2009 | Fitzgerald |
| 2009/0298480 A1 | 12/2009 | Khambete et al. |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0070621 A1 | 3/2010 | Urdan et al. |
| 2010/0076814 A1 | 3/2010 | Manning |
| 2010/0088152 A1 | 4/2010 | Bennett |
| 2010/0088373 A1 | 4/2010 | Pinkham |
| 2010/0114739 A1 | 5/2010 | Johnston |
| 2010/0121676 A1 | 5/2010 | Jackson |
| 2010/0146110 A1 | 6/2010 | Christensen et al. |
| 2010/0153175 A1 | 6/2010 | Pearson et al. |
| 2010/0153207 A1 | 6/2010 | Roberts et al. |
| 2010/0153544 A1 | 6/2010 | Krassner et al. |

(56) References Cited

U.S. PATENT DOCUMENTS

| | | |
|---|---|---|
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0066497 A1 | 3/2011 | Gopinath et al. |
| 2011/0087519 A1 | 4/2011 | Fordyce, III et al. |
| 2011/0087919 A1 | 4/2011 | Deshmukh et al. |
| 2011/0093327 A1 | 4/2011 | Fordyce et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0238520 A1 | 9/2011 | Selley |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0282997 A1 | 11/2011 | Prince et al. |
| 2011/0288907 A1 | 11/2011 | Harvey et al. |
| 2012/0005015 A1 | 1/2012 | Park et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1 | 3/2012 | Perez et al. |
| 2012/0109709 A1 | 5/2012 | Fordyce et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0143713 A1 | 6/2012 | Dittus et al. |
| 2012/0151079 A1 | 6/2012 | Basehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0221559 A1 | 8/2012 | Kidron |
| 2012/0239407 A1 | 9/2012 | Lynch et al. |
| 2012/0239809 A1 | 9/2012 | Mazumdar et al. |
| 2012/0254466 A1 | 10/2012 | Jungck |
| 2012/0265606 A1 | 10/2012 | Patnode |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2013/0007794 A1 | 1/2013 | Basehanic et al. |
| 2013/0013308 A1 | 1/2013 | Cao et al. |
| 2013/0014144 A1 | 1/2013 | Bhatia et al. |
| 2013/0014223 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0080256 A1 | 3/2013 | Piccionelli |
| 2013/0080259 A1 | 3/2013 | Durvasula et al. |
| 2013/0080263 A1 | 3/2013 | Goldman et al. |
| 2013/0080268 A1 | 3/2013 | Gordon et al. |
| 2013/0085894 A1 | 4/2013 | Chan et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0198383 A1 | 8/2013 | Tseng et al. |
| 2013/0204694 A1 | 8/2013 | Banister et al. |
| 2013/0212188 A1 | 8/2013 | Duterque et al. |
| 2013/0212638 A1 | 8/2013 | Wilson |
| 2013/0237254 A1 | 9/2013 | Papakipos et al. |
| 2013/0246220 A1 | 9/2013 | Hammad et al. |
| 2013/0246389 A1 | 9/2013 | Osann, Jr. |
| 2013/0246609 A1 | 9/2013 | Topchy et al. |
| 2013/0254897 A1 | 9/2013 | Reedy et al. |
| 2013/0268365 A1 | 10/2013 | Gildfind |
| 2013/0282898 A1 | 10/2013 | Kalus et al. |
| 2013/0290070 A1 | 10/2013 | Abraham et al. |
| 2013/0290096 A1 | 10/2013 | Lizotte, III |
| 2013/0297411 A1 | 11/2013 | Van Datta et al. |
| 2013/0297467 A1 | 11/2013 | Kidron et al. |
| 2013/0325588 A1 | 12/2013 | Kalyanam et al. |
| 2013/0326597 A1 | 12/2013 | Matsushita et al. |
| 2013/0331971 A1 | 12/2013 | Bida et al. |
| 2013/0332604 A1 | 12/2013 | Seth et al. |
| 2014/0033317 A1 | 1/2014 | Barber |
| 2014/0040171 A1 | 2/2014 | Segalov et al. |
| 2014/0058836 A1 | 2/2014 | Wiseman et al. |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0123253 A1 | 5/2014 | David et al. |
| 2014/0156761 A1 | 6/2014 | Heffernan et al. |
| 2014/0173746 A1 | 6/2014 | Armstrong-Muntner et al. |
| 2014/0278981 A1 | 9/2014 | Mersov et al. |
| 2014/0279074 A1 | 9/2014 | Chen et al. |
| 2014/0280896 A1 | 9/2014 | Papakostas et al. |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019322 A1 | 1/2015 | Alla et al. |
| 2015/0019327 A1 | 1/2015 | Mazumdar et al. |
| 2015/0046248 A1 | 2/2015 | Ben-Yaacov et al. |
| 2015/0046579 A1 | 2/2015 | Perez et al. |
| 2015/0066586 A1 | 3/2015 | Teraoka et al. |
| 2015/0070585 A1 | 3/2015 | Sharif-Ahmadi et al. |
| 2015/0186403 A1 | 7/2015 | Srivastava et al. |
| 2015/0189500 A1 | 7/2015 | Bosworth et al. |
| 2015/0193816 A1 | 7/2015 | Toupet et al. |
| 2015/0222951 A1 | 8/2015 | Ramaswamy |
| 2015/0262207 A1 | 9/2015 | Rao et al. |
| 2016/0063539 A1 | 3/2016 | Alla et al. |
| 2017/0018184 A1 | 1/2017 | Northrup et al. |

FOREIGN PATENT DOCUMENTS

| | | |
|---|---|---|
| CN | 1898662 | 1/2007 |
| CN | 101077014 | 11/2007 |
| CN | 101222348 | 7/2008 |
| CN | 101505247 | 8/2009 |
| CN | 101536503 | 9/2009 |
| CN | 104520839 | 4/2015 |
| CN | 104541513 | 4/2015 |
| CN | 104584564 | 4/2015 |
| EP | 0325219 | 7/1989 |
| EP | 0703683 | 3/1996 |
| EP | 0744695 | 11/1996 |
| EP | 1059599 | 12/2000 |
| GB | 2176639 | 12/1986 |
| JP | H05324352 | 12/1993 |
| JP | 07262167 | 10/1995 |

(56) References Cited

FOREIGN PATENT DOCUMENTS

| | | |
|---|---|---|
| JP | 2001084272 | 3/2001 |
| JP | 2001256395 | 9/2001 |
| JP | 2001282982 | 10/2001 |
| JP | 2001357192 | 12/2001 |
| JP | 2002091852 | 3/2002 |
| JP | 2002163562 | 6/2002 |
| JP | 2002373152 | 12/2002 |
| JP | 2003519877 | 6/2003 |
| JP | 2004504674 | 2/2004 |
| JP | 2004362201 | 12/2004 |
| JP | 2006127320 | 5/2006 |
| JP | 2006127321 | 5/2006 |
| JP | 2007052633 | 3/2007 |
| JP | 2010039845 | 2/2010 |
| JP | 2010257448 | 11/2010 |
| JP | 2012014267 | 1/2012 |
| KR | 20020037980 | 5/2002 |
| KR | 20070051879 | 5/2007 |
| KR | 100765735 | 10/2007 |
| KR | 20090020558 | 2/2009 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9600950 | 1/1996 |
| WO | 99600950 | 1/1996 |
| WO | 9617467 | 6/1996 |
| WO | 9628904 | 9/1996 |
| WO | 99628904 | 9/1996 |
| WO | 9632815 | 10/1996 |
| WO | 99632815 | 10/1996 |
| WO | 9637983 | 11/1996 |
| WO | 99637983 | 11/1996 |
| WO | 9641495 | 12/1996 |
| WO | 99641495 | 12/1996 |
| WO | 0041115 | 7/2000 |
| WO | 2000041115 | 7/2000 |
| WO | 0152168 | 7/2001 |
| WO | 200152168 | 7/2001 |
| WO | 0207054 | 1/2002 |
| WO | 03027860 | 4/2003 |
| WO | 2005013072 | 2/2005 |
| WO | 2005024689 | 3/2005 |
| WO | 2008150575 | 12/2008 |
| WO | 2009117733 | 9/2009 |
| WO | 2010088372 | 8/2010 |
| WO | 2010104285 | 9/2010 |
| WO | 2010132492 | 11/2010 |
| WO | 2011097624 | 8/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014172472 | 10/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |

OTHER PUBLICATIONS

Emil Protalinksi, "US congressmen ask FTC to investigate Facebook cookies," Internet article, retrieved from http://www.zdnet.com/blog/facebook/us-congressmen-ask-ftc-to-investigate-facebook-cookies/4218, Sep. 28, 2011, 2 pages.

Javascript and Ajax Forum, Sep. 28, 2005, [retrieved from Internet at http://www.webmasterworld.com/forum91/4465.htm on Jun. 29, 2011]. 4 pages.

Adam et al., "Privacy Preserving Integration of Health Care Data," AMIA 2007 Symposium Proceedings, 6 pages.

Patent Cooperation Treaty, "International Search Report," issued in connection with International Patent Application No. PCT/US2013/057045, on Dec. 27, 2013, 3 pages.

Patent Cooperation Treaty, "Written Opinion of the International Searching Authority," issued in connection with International Patent Application No. PCT/US2013/057045, on Dec. 27, 2013, 5 pages.

United States Patent and Trademark Office, "Notice of Allowance," issued in connection with U.S. Appl. No. 14/127,414, Oct. 17, 2014, 7 pages.

United States Patent and Trademark Office, "Supplemental Notice of Allowability," issued in connection with U.S. Appl. No. 14/127,414, Nov. 17, 2014, 4 pages.

Australian Government, IP Australia, "Patent Examination Report No. 1," issued in connection with Australian Application No. 2013204953, Dec. 23, 2014, 5 pages.

Japanese Patent Office, "Notice of Reasons for Rejection," issued in connection with Japanese Patent Application No. P2015-524512 on Jun. 30, 2015, 6 pages.

Canadian Intellectual Property Office, "Examination Search Report," issued in connection with Application No. 2,873,128, on Jan. 7, 2015, 3 pages.

United States Patent and Trademark Office, "Non-Final Office Action," issued in connection with U.S. Appl. No. 14/025,567, Dec. 11, 2015, 28 pages.

The State Intellectual Property Office of China, "2nd Office Action," issued in connection with application No. 201280003504.8, on Nov. 30, 2015, 9 pages.

Braverman, Samantha, "Are the Online Marketing Efforts of TV Shows and Programs Worthwhile?" Mar. 30, 2011, 5 pages.

Edwards, Jim, "Apple Wants More Advertisers to Use Its iPhone Tracking System," Business Insider, Jun. 13, 2013. Retrieved from http://www.businessinsider.com/apples-idfa-and-ifa-tracking-system-2013-6 , 2 pages.

Canadian Intellectual Property Office, "Office Action," issued in connection with Application No. 2,873,128, Mar. 17, 2016, 4 pages.

Patent Cooperation Treaty, "International Preliminary Report on Patentability," issued by the International Searching Authority in connection with PCT application No. PCT/US2013/057045, mailed Mar. 3, 2015, 1 page.

Patent Cooperation Treaty, "Written Opinion of the International Searching Authority," issued by the International Searching Authority in connection with PCT application No. OCT/US2013/057045, mailed Dec. 27, 2013, 5 pages.

European Patent Office, "Extended European Search Report," issued in connection with application No. EP 13833698.7, on Apr. 7, 2016, 7 pages.

IP Australia, "Patent Examination Report No. 2," issued in connection with Australian Application No. 2013204953, dated Feb. 19, 2016, 3 pages.

IP Australia, "Notice of Acceptance," issued in connection with Australian Application No. 2013204953, dated Aug. 29, 2016, 2 pages.

The State Intellectual Property Office of China, "1st Office Action," issued in connection with application No. 201380029271.3, dated Nov. 4, 2015, 12 pages.

The State Intellectual Property Office of China, "2nd Office Action," issued in connection with application No. 201380029271.3, dated May 31, 2016, 30 pages.

Japanese Patent Office, "Notice of Acceptance," issued in connection with Japanese Patent Application No. P2015-524512 dated Feb. 28, 2016, 3 pages.

United States Patent and Trademark Office, "Non-Final Office Action," issued in connection with U.S. Appl. No. 14/562,319, dated Jun. 1, 2015, 10 pages.

Patent Cooperation Treaty, "International Search Report and Written Opinion of the International Searching Authority," issued in connection with Application No. PCT/US2014/031342, dated Jul. 28, 2014, 13 pages.

(56) References Cited

OTHER PUBLICATIONS

Patent Cooperation Treaty, "International Search Report and Written Opinion of the International Searching Authority," issued in connection with Application No. PCT/US2014/034389, dated Sep. 5, 2014, 15 pages.
"United States Patent and Trademark Office, "Non-Final Office Action, issued in connection with U.S. Appl. No. 14/014,050, dated Sep. 12, 2014, 32 pages.
Patent Cooperation Treaty, "International Search Report," issued in connection with Application No. PCT/US2014/068202, dated Apr. 10, 2015, 3 pages.
Patent Cooperation Treaty, "Written Opinion," issued in connection with Application No. PCT/US2014/068202, dated Apr. 10, 2015, 7 pages.
European Patent Office, "Extended European Search Report," issued in connection with application No. EP 14004028.8, dated Apr. 9, 2015, 7 pages.
United States Patent and Trademark Office, "Non-Final Office Action," issued in connection with U.S. Appl. No. 14/014,050, dated May 28, 2015, 4 pages.
United States Patent and Trademark Office, "Final Office Action," issued in connection with U.S. Appl. No. 13/963,737, dated Sep. 21, 2015, 14 pages.
IP Australia, "Examination Report," issued in connection with Australian Patent Application No. 2014254014, dated Jun. 17, 2015, 3 pages.
Whiting, Seth W., et al., "Creating an Iphone Application for Collecting Continuous ABC Data," Journal of Applied Behavior Analysis, vol. 45, No. 3, Fall 2012, p. 946-656.
Liu, et al., "Socialize Spontaneously with Mobile Application," INFOCOM 2012, Orlando, FL, Mar. 25-30, 2012, p. 1942-1950, 9 pages.
Evensen, Pal, et al, "AdScorer: An Event-Based System for Near Real-Time Impact Analysis of Televison Advertisements," DEBS'12, Jul. 16-20, 2012, p. 85-94, 10 pages.
Dhillon, Jaspaljeet Singh, et al., "Leveraging Consumer Sensing Devices for Telehealth," CHINZ 2012, Dundin, New Zealand, Jul. 2-3, 2012, p. 29-35, 7 pages.
Buyya, Rajkumar, et al., "Cloudbus Toolkit for Market-Oriented Computing," CloudCom 2009, LNCS 5931, Springer-Verlag, Berlin, Germany, 2009, p. 24-44, 21 pages.
United States Patent and Trademark Office, "Non-Final Office Action," issued in connection with U.S. Appl. No. 14/014,050, dated Nov. 23, 2015, 11 pages.
United States Patent and Trademark Office, "Non-Final Office Action," issued in connection with U.S. Appl. No. 14/014,050, dated Sep. 28, 2016, 11 pages.
United States Patent and Trademark Office, "Notice of Allowance," issued in connection with U.S. Appl. No. 14/984,624, dated Jul. 27, 2016, 9 pages.
United State Patent and Trademark Office, "Non-Final Office Action," issued in connection with U.S. Appl. No. 14/473,654, dated Oct. 31, 2016, 17 pages.
"ID3" Wikipedia, downloaded from: en.wikipedia.org/wiki/ID3 on Apr. 16, 2015, 15 pages.
"Software Development Kit," Wikipedia, downloaded from en.wikipedia/org/Software_development_kit on Apr. 16, 2015, 2 pages.
United State Patent and Trademark Office, "Non-Final Office Action," issued in connection with U.S. Appl. No. 13/963,737, dated Apr. 27, 2015, 13 pages.
United State Patent and Trademark Office, "Non-Final Office Action," issued in connection with U.S. Appl. No. 13/963,737, dated May 17, 2016, 15 pages.
State Intellectual Property Office of China, "Notice of Allowance," issued in connection with Chinese Patent Application No. 201380029271.3, dated Feb. 6, 2017, 5 pages.
European Patent Office, "Communication Pursuant to Article 94(3) EPC," issued in connection with European Patent Application No. 13833698.7, dated Jan. 31, 2017, 4 pages.

Canadian Intellectual Property Office, "Office Action," issued in connection with Canadian patent application No. 2,873,128, dated Mar. 30, 2017, 4 pages.
Coffey, "Internet Audience Measurement: A Practioner's View," Journal of Interactive Advertising, vol. 1, No. 2, Spring 2001, pp. 10-17.
Fliptop, "Fliptop Person API Documentation," https://developer.fliptop.com/documentation, retrieved on May 7, 2013, 6 pages.
Fliptop, "Get, Keep and Grow Customers with Fliptop's Customer Intelligence Application," www.fliptop.com/feature#social_matching, retrieved on May 7, 2013, 3 pages.
Fliptop, "What is Fliptop?," www.fliptop.com/about_us, retrieved on May 7, 2013, 1 page.
Rapleaf, "Fast. Simple. Secure," www.rapleaf.com/why-rapleaf/, retrieved on May 7, 2013, 3 pages.
Rapleaf, "Frequently Asked Questions," www.rapleaf.com/about-us/faq/#where, retrieved on May 7, 2013, 3 pages.
Rapleaf, "The Consumer Data Marketplace," www.rapleaf.com/under-the-hood/, retrieved on May 7, 2013, 2 pages.
Rainier, "Why Businesses Should Use Google Plus," The Social Media Guide, thesocialmediaguide.com/social_media/why-businesses-should-use-google-plus, retrieved on May 7, 2013, 9 pages.
Vega, "Nielsen Unveils New Ad Measurement Product," The New York Times, Sep. 27, 2010, 7 pages.
Launder, "Media Journal: Nielsen to Test Online-TV Viewing Tool," The Wall Street Journal, Apr. 30, 2013, 2 pages.
Sharma, "Nielsen Gets Digital to Track Online TV Viewers," All Things, Apr. 30, 2013, 3 pages.
Chloe Albanesius, "Facebook Issues Fix For Several Tracking Cookies," Internet article, www.pcmag.com, Sep. 28, 2011, 2 pages.
Emil Protalinski, "Facebook denies cookie tracking allegations," Internet article, www.zdnet.com, Sep. 25, 2011, 2 pages.
Emil Protalinski, "Facebook fixes cookie behavior after logging out," Internet article, www.zdnet.com, Sep. 27, 2011, 2 pages.
Nik Cubrilovic, "Logging out of Facebook is not enough," Internet article, www.nikcub.appspot.com, Sep. 25, 2011, 3 pages.
Emil Protalinski, "US congressman ask FTC to investigate Facebook cookies," Internet article, retrieved from http://www.zdnet.com/blog/facebook/us-congressman-ask-ftc-to-investigate-facebook-cookies/4218, Sep. 28, 2011, 2 pages.
Javascript and Ajax Forum, Sep. 28, 2005, [retrieved from Internet at http://www.webmasterworld.com/forum91/4465.htm on Jun. 29, 2011], 4 pages.
Vranica, "Nielsen Testing a New Web-Ad Metric," The Wall Street Journal, Sep. 23, 2010 (2 pages).
Wikipedia, "Mental Poker," Jan. 12, 2010, [retrieved from Internet at http://en.wikipedia.org/wiki/Mental_poker on Sep. 21, 2010], 5 pages.
The Nielsen Company, "Nielsen Unveils New Online Advertising Measurement," Sep. 27, 2010, [retrieved from Internet at http://nielsen.com/us/en/insights/press-room/2010/nielsen_unveils_newonlineadvertisingmeasurement.html on May 31, 2012], 3 pages.
Adam et al., "Privacy Preserving Integration of Health Car Data," AMIA 2007 Symposium Proceedings, 6 pages.
Patent Cooperation Treaty, "International Search Report," issued in connection with International Patent Application No. PCT/US2013/057045, dated Dec. 27, 2013, 3 pages.
Patent Cooperation Treaty, "Written Opinion of the International Searching Authority," issued in connection with International Patent Application No. PCT/US2013/057045, dated Dec. 27, 2013, 5 pages.
United States Patent and Trademark Office, "Notice of Allowance," issued in connection with U.S. Appl. No. 14/127,414, dated Oct. 17, 2014, 7 pages.
United States Patent and Trademark Office, "Supplemental Notice of Allowability," issued in connection with U.S. Appl. No. 14/127,414, dated Nov. 17, 2014, 4 pages.
Australian Government, IP Australia, "Patent Examination Report No. 1," issued in connection with Australian Application No. 2013204953, dated Dec. 23, 2014, 5 pages.
Japanese Patent Office, "Notice of Reasons of Rejection," issued in connection with Japanese Patent Application No. P2015-524512 dated Jun. 30, 2015, 6 pages.

(56) References Cited

OTHER PUBLICATIONS

Canadian Intellectual Property Office, "Examination Search Report," issued in connection with Application No. 2,873,128, dated Jan. 7, 2015, 3 pages.
United States Patent and Trademark Office, "Non-Final Office Action," issued in connection with U.S. Appl. No. 14/025,567, dated Dec. 11, 2015, 28 pages.
The State Intellectual Property Office of China, "2nd Office Action," issued in connection with application No. 201280003504.8, dated Nov. 30, 2015, 9 pages.
Korean Intellectual Property Office, "Notice of Allowance," issued in connection with Application No. 10-2014-7034080, Jan. 29, 2016, 3 pages.
Arbitron Inc., "The Infinite Dial 2011: Navigating Digital Platforms," Edison Research, 2011, 83 pages.
Braverman, Samantha, "Are the Online Marketing Efforts of TV Shows and Programs Worthwhile?"Mar. 30, 2011, 5 pages.
Danaher, Peter J., "A Canonical Expansion Model for Multivariate Media Exposure Distributions: A Generalization of the 'Duplication of Viewing Law,'" Journal of Marketing Research, vol. XXVIII, Aug. 1991, 7 pages.
Edwards, Jim, "Apple Wants More Advertisers To Use Its iPhone Tracking System," Business Insider, Jun. 13, 2013. Retrieved from http://www.businessinsider.com/apples-idfa-and-ifa-tracking-system-2013-6, 2 pages.
Enoch et al., "Cracking the Cross-Media Code: How to Use Single-Source Measures to Examine Media Cannibalization and Convergence," Journal of Advertising Research, Jun. 2010, 13 pages.
Facebook For Business, "Measuring Conversions on Facebook, Across Devices and in Mobile Apps" Aug. 14, 2014. Retrieved from https://www.facebook.com/business/news/cross-device-measurement, 3 pages.
Goerg et al., "How Many Millenials Visit YouTube? Estimating Unobserved Events From Incomplete Panel Data Conditioned on Demographic Covariates," Google Inc., Apr. 27, 2015, 27 pages.
Goerg et al., "How Many People Visit YouTube? Imputing Missing Events in Panels With Excess Zeros," Google Inc., 2015, 6 pages.
Headen et al., "The Duplication of Viewing Law and Television Media Schedule Evaluation," Journal of Marketing Research, vol. XVI, Aug. 1979, 9 pages.
Hothorn et al., "Unbiased Recursive Partitioning: A Conditional Inference Framework," Journal of Computational and Graphical Statistics, vol. 15, No. 3, 2006, pp. 651-674, 21 pages.
Huang et al., "Modeling the Audience's Banner Ad Exposure For Internet Advertising Planning," Journal of Advertising, vol. 35, No. 2, Summer 2006, 15 pages.

The Nielsen Company, "How Teens Use Media: A Nielsen Report on the Myths and Realities of Teen Media Trends," Jun. 2009, 17 pages.
Rust et al., "A Comparative Study of Television Duplication Models," Journal of Advertising, vol. 10, No. 3, 1981, 6 pages.
Taboga, Marco, "Linear combinations of normal random variables", from "Lectures on probability and statistics," 2010, <http://www.statlect.com/normal_distribution_linear_combinations.htm>, 4 pages.
Canadian Intellectual Property Office, "Office Action," issued in connection with Application No. 2,873,128, dated Mar. 17, 2016, 4 pages.
Patent Cooperation Treaty, "International Preliminary Report on Patentability," issued by the International Searching Authority in connection with PCT application No. PCT/US2013/057045, dated Mar. 3, 2015, 1 page.
Patent Cooperation Treaty, "Written Opinion of the International Searching Authority," issued by the International Searching Authority in connection with PCT application No. OCT/US2013/057045, dated Dec. 27, 2013, 5 pages.
European Patent Office, "Extended European Search Report," issued in connection with application No. EP 13833698.7, dated Apr. 7, 2016, 7 pages.
United States Patent and Trademark Office, "Non-final Office Action," issued in connection with U.S. Appl. No. 14/014,050, dated May 9, 2017, 15 pages.
United States Patent and Trademark Office, "Non-final Office Action," issued in connection with U.S. Appl. No. 14/473,654, dated May 17, 2017, 16 pages.
European Patent Office, "Extended European Search Report," issued in connection with European Patent Application No. 14877407.8, dated May 24, 207, 11 pages.
Mexican Intellectual Property Office, "2nd Office Action," issued in connection with Mexican Patent Application No. MX/a/2014/014747, dated Jun. 23, 2017, 6 pages.
European Patent Office, "Communication Pursuant to Article 94(3)," issued in connection with European Patent Application 11827473.7, dated Jun. 20, 2017, 9 pages.
"Storing and Retrieving non 3rd Party Cookies Across Multiple Domains," Google Answers, Jun. 30, 2006, retrieved from http://answers.google.com/answers/threadview/id/742376.html, 4 pages.
Japanese Patent Office, "Notice of Reasons for Rejection," issued in connection with Japanese patent application No. 2016-051033, dated Sep. 5, 2017, 4 pages.
United States Patent and Trademark Office, "Non-final Office Action," issued in connection with U.S. Appl. No. 15/449,331, dated Oct. 11, 2017 16 pages.
IP Australia, "Examination Report No. 1," issued in connection with Australian Patent Application No. 2016269512, on Dec. 15, 2017, 7 pages.

\* cited by examiner

METHODS AND APPARATUS TO COLLECT DISTRIBUTED USER INFORMATION FOR MEDIA IMPRESSIONS AND SEARCH TERMS

RELATED APPLICATIONS

This patent arises from a continuation of U.S. patent application Ser. No. 14/562,319, filed Dec. 5, 2014, which is a continuation of U.S. patent application Ser. No. 14/127,414, filed Dec. 18, 2013, now U.S. Pat. No. 8,930,701, which is a national stage entry of International Patent Application No. PCT/US2013/057045, filed Aug. 28, 2013, which claims priority to Australian Patent Application No. 2013204953, filed on Apr. 12, 2013, U.S. Provisional Patent Application No. 61/697,597, filed on Sep. 6, 2012, and U.S. Provisional Patent Application No. 61/695,169, filed on Aug. 30, 2012, all of which are hereby incorporated herein by reference in their entireties.

FIELD OF THE DISCLOSURE

The present disclosure relates generally to monitoring media and, more particularly, to methods and apparatus to collect distributed user information for media impressions and search terms.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media programs (e.g., television programs or radio programs, movies, DVDs, etc.) exposed to those panel members. In this manner, the audience measurement entity can determine exposure measures for different media content based on the collected media measurement data.

Techniques for monitoring user access to Internet resources such as web pages, advertisements and/or other content has evolved significantly over the years. Some known systems perform such monitoring primarily through server logs. In particular, entities serving content on the Internet can use known techniques to log the number of requests received for their content at their server.

DETAILED DESCRIPTION

Figure 1:
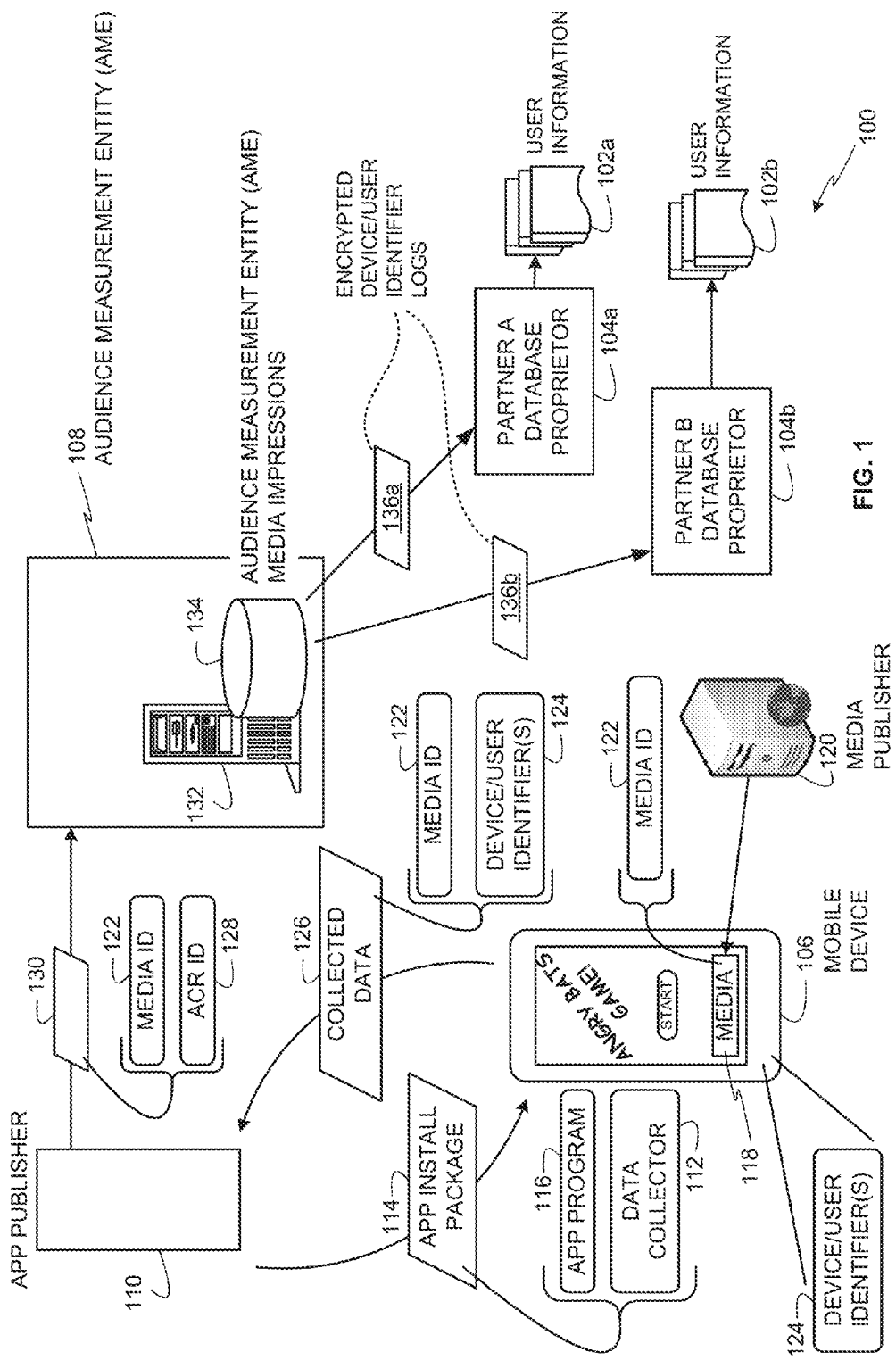
FIG. 1 depicts an example system to collect user information from distributed database proprietors for associating with impressions of media presented at mobile devices.

Techniques for monitoring user access to Internet resources such as web pages, advertisements and/or other content has evolved significantly over the years. At one point in the past, such monitoring was done primarily through server logs. In particular, entities serving content on the Internet would log the number of requests received for their content at their server. Basing Internet usage research on server logs is problematic for several reasons. For example, server logs can be tampered with either directly or via zombie programs which repeatedly request content from the server to increase the server log counts. Secondly, content is sometimes retrieved once, cached locally and then repeatedly viewed from the local cache without involving the server in the repeat viewings. Server logs cannot track these views of cached content. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet content to be tracked is tagged with beacon instructions. In particular, monitoring instructions are associated with the HTML of the content to be tracked. When a client requests the content, both the content and the beacon instructions are downloaded to the client. The beacon instructions are, thus, executed whenever the content is accessed, be it from a server or from a cache.

The beacon instructions cause monitoring data reflecting information about the access to the content to be sent from the client that downloaded the content to a monitoring entity. Typically, the monitoring entity is an audience measurement entity that did not provide the content to the client and who is a trusted third party for providing accurate usage statistics (e.g., The Nielsen Company, LLC). Advantageously, because the beaconing instructions are associated with the content and executed by the client browser whenever the content is accessed, the monitoring information is provided to the audience measurement company irrespective of whether the client is a panelist of the audience measurement company.

It is useful, however, to link demographics and/or other user information to the monitoring information. To address this issue, the audience measurement company establishes a panel of users who have agreed to provide their demographic information and to have their Internet browsing activities monitored. When an individual joins the panel, they provide detailed information concerning their identity and demographics (e.g., gender, race, income, home location, occupation, etc.) to the audience measurement company. The audience measurement entity sets a cookie on the panelist computer that enables the audience measurement entity to identify the panelist whenever the panelist accesses tagged content and, thus, sends monitoring information to the audience measurement entity.

Since most of the clients providing monitoring information from the tagged pages are not panelists and, thus, are unknown to the audience measurement entity, it is necessary to use statistical methods to impute demographic information based on the data collected for panelists to the larger population of users providing data for the tagged content. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the computers of their subscribers to enable the database proprietor to recognize the user when they visit their website.

The protocols of the Internet make cookies inaccessible outside of the domain (e.g., Internet domain, domain name, etc.) on which they were set. Thus, a cookie set in the amazon.com domain is accessible to servers in the amazon.com domain, but not to servers outside that domain. Therefore, although an audience measurement entity might find it advantageous to access the cookies set by the database proprietors, they are unable to do so. In addition, apps that run on mobile device platforms do not use cookies in the same way as web browsers. Although apps do present media that is worthy of impression tracking, prior techniques that use cookie-based approaches for tracking such media impressions are unusable in the app environment context.

In view of the foregoing, an audience measurement company would like to leverage the existing databases of database proprietors to collect more extensive Internet usage and demographic data and/or user data for associating with media impressions tracked on devices that execute apps that do not employ cookies which are more commonly used in web browsers. However, the audience measurement entity is faced with several problems in accomplishing this end. For example, a problem is presented as to how to access the data of the database proprietors without compromising the privacy of the subscribers, the panelists, or the proprietors of the tracked content. Another problem is how to access this data given the technical restrictions imposed by app software platforms of mobile devices that do not employ cookies.

Example methods, apparatus and/or articles of manufacture disclosed herein enable tracking media impressions for media presented by mobile device apps that execute on mobile devices, without needing to rely on cookies to track such media impressions. In this manner, an audience measurement entity (AME) can track media impressions on mobile devices on which apps that do not employ cookies have higher usage rates than web browsers that do employ cookies. Examples disclosed herein also protect privacies of users by encrypting identification information in such a way that personally-identifying information is not revealed to the AME. Examples disclosed herein accomplish this by using an application campaign rating (ACR) identifier (ID) that includes one or more encrypted device and/or user identifier(s) (i.e., device/user identifier(s)) retrieved from a mobile device. The one or more encrypted device/user identifier(s) can then be used to retrieve user information for a user of the mobile device by sending the one or more encrypted device/user identifier(s) to one or more corresponding database proprietors that store user information for its registered users. In the illustrated examples, to protect users' privacies, the AME does not have keys to decrypt the encrypted device/user identifiers, and each database proprietor has only its respective key(s) useable to decrypt only device/user identifier(s) pertaining to its services (e.g., wireless carrier services, social networking services, email services, mobile phone ecosystem app or media services, etc.). In this manner, personally-identifying information for particular services will not be revealed to the AME or to just any database proprietor, but only to the database proprietor that provides the particular service.

In examples disclosed herein, when an audience measurement entity receives an ACR ID including one or more encrypted device/user identifier(s), the audience measurement entity can request user information from one or more partnered database proprietors for the encrypted device/user identifier(s). In this manner, the partnered database proprietor(s) can provide user information to the audience measurement entity for the encrypted device/user identifier(s), and associate the user information with one or more media ID's of media presented by app(s) on one or more mobile device(s). Because the identification of users or client mobile devices is done with reference to enormous databases of users far beyond the quantity of persons present in a conventional audience measurement panel, the data developed from this process is extremely accurate, reliable and detailed. In some examples, by agreeing to participate in concerted audience measurement efforts, the partnered database proprietors are provided with audience user information and exposure information collected by other partnered database proprietors. In this manner, partnered database proprietors can supplement their own audience exposure metrics with information provided by other partnered database proprietors.

Example methods, apparatus, and articles of manufacture disclosed herein can be used to determine content impressions, advertisement impressions, content exposure, and/or advertisement exposure using user information, which is distributed across different databases (e.g., different website owners, service providers, etc.) on the Internet. Not only do example methods, apparatus, and articles of manufacture disclosed herein enable more accurate correlation of Internet media exposure to user information, but they also effectively extend panel sizes and compositions beyond persons participating in the panel of an audience measurement entity and/or a ratings entity to persons registered in other Internet databases such as the databases of wireless service carriers, mobile software/service providers, social medium sites (e.g., Facebook, Twitter, Google, etc.), and/or any other Internet sites such as Yahoo!, MSN, Apple iTunes, Experian, etc. This extension effectively leverages the media impression tracking capabilities of the audience measurement entity and the use of databases of non-AME entities such as social media and other websites to create an enormous, demographically accurate panel that results in accurate, reliable measurements of exposures to Internet content such as advertising and/or programming.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. Unlike traditional techniques in which audience measurement entities rely solely on their own panel member data to collect demographics-based audience measurement, example methods, apparatus, and/or articles of manufacture disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel. Any entity having a database identifying demographics of a set of individuals may cooperate with the audience measurement entity. Such entities may be referred to as "database proprietors" and include entities such as wireless service carriers, mobile software/service providers, social medium sites (e.g., Facebook, Twitter, Google, etc.), and/or any other Internet sites such as Yahoo!, MSN, Apple iTunes, Experian, etc.

Example methods, apparatus, and/or articles of manufacture disclosed herein may be implemented by an audience measurement entity (e.g., any entity interested in measuring or tracking audience exposures to advertisements, content, and/or any other media) in cooperation with any number of database proprietors such as online web services providers to develop online media exposure metrics. Such database proprietors/online web services providers may be wireless service carriers, mobile software/service providers, social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web service(s) site that maintains user registration records.

In some examples, to increase the likelihood that measured viewership is accurately attributed to the correct demographics, example methods, apparatus, and/or articles of manufacture disclosed herein use user information located in the audience measurement entity's records as well as user information located at one or more database proprietors (e.g., web service providers) that maintain records or profiles of users having accounts therewith. In this manner, example methods, apparatus, and/or articles of manufacture disclosed herein may be used to supplement user information maintained by a ratings entity (e.g., an audience measurement company such as The Nielsen Company of Schaumburg, Ill., United States of America, that collects media exposure measurements, demographics, and/or other user information) with user information from one or more different database proprietors (e.g., web service providers).

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users, and/or other user information, and use server impression counts, and/or other techniques to track quantities of impressions attributable to those users. Online web service providers such as wireless service carriers, mobile software/service providers, social network sites (e.g., Facebook, Twitter, MySpace, etc.), multi-service sites (e.g., Yahoo!, Google, Experian, etc.), online retailer sites (e.g., Amazon.com, Buy.com, etc.), etc. (collectively and individually referred to herein as online database proprietors) maintain detailed demographic information (e.g., age, gender, geographic location, race, income level, education level, religion, etc.) collected via user registration processes. An impression corresponds to a home or individual having been exposed to the corresponding media content and/or advertisement. Thus, an impression represents a home or an individual having been exposed to an advertisement or content or group of advertisements or content. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

FIG. 1 depicts an example system 100 to collect user information (e.g., user information 102a and 102b) from distributed database proprietors 104a and 104b for associating with impressions of media presented at a mobile device 106. In the illustrated examples, user information or user data includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. Examples disclosed herein are described in connection with a mobile device, which may be a mobile phone, a mobile communication device, a tablet, a gaming device, a portable media presentation device, etc. However, examples disclosed herein may be implemented in connection with non-mobile devices such as internet appliances, smart televisions, internet terminals, computers, or any other device capable of presenting media received via network communications.

In the illustrated example of FIG. 1, to track media impressions on the mobile device 106, an audience measurement entity (AME) 108 partners with or cooperates with an app publisher 110 to download and install a data collector 112 on the mobile device 106. The app publisher 110 of the illustrated example may be a software app developer that develops and distributes apps to mobile devices and/or a distributor that receives apps from software app developers and distributes the apps to mobile devices. In the illustrated example, to download and install the data collector 112 on the mobile device 106, the app publisher 110 downloads an app install package 114 to the mobile device 106 when the mobile device 106 requests a purchased or free app program 116. The app publisher 110 locates the requested app program 116 and the data collector 112 in the app install package 114, and then it sends the app install package 114 to the mobile device 106 for installing the app program 116 and the data collector 112. In some examples, the app publisher 110 may first obtain the consent of a user of the mobile device 106 to participate in a media tracking program before sending the data collector 112 for installation on the mobile device 106.

In the illustrated example, the app program 116 is a game entitled "Angry Bats" that presents media 118 received from a media publisher 120. The media 118 may be an advertisement, video, audio, text, a graphic, a web page, news, educational media, entertainment media, or any other type of media. In the illustrated example, a media ID 122 is provided in the media 118 to enable identifying the media 118 so that the AME 108 can credit the media 118 with media impressions when the media 118 is presented on the mobile device 106 or any other device that is monitored by the AME 108.

In the illustrated example, the AME 108 provides the data collector 112 to the app publisher 110 for packaging with the app program 116 in the app install package 114. In some examples, the app publisher 110 provides the data collector 112 as a program separate from the app program 116. In other examples, the app publisher 110 compiles or otherwise includes the data collector 112 in the app program 116 rather than installing the data collector 112 as a program separate from the app program 116. The data collector 112 of the illustrated example includes instructions (e.g., Java, java script, or any other computer language or script) that, when executed by the mobile device 106, cause the mobile device 106 to collect the media ID 122 of the media 118 presented by the app program 116 and/or the mobile device 106, and to collect one or more device/user identifier(s) 124 stored in the mobile device 106. The device/user identifier(s) 124 of the illustrated example include identifiers that can be used by corresponding ones of the partner database proprietors 104a-b to identify the user or users of the mobile device 106, and to locate user information 102a-b corresponding to the user(s). For example, the device/user identifier(s) 124 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), etc. In some examples, fewer or more device/user identifier(s) 124 may be used. In addition, although only two partner database proprietors 104a-b are shown in FIG. 1, the AME 108 may partner with any number of partner database proprietors to collect distributed user information (e.g., the user information 102a-b).

In some examples, the types of device/user identifiers 124 are different from device to device depending on the type of device, the manufacturer of the device, the software installed on the device, etc. For example, a mobile device having cellular 2G, 3G, and/or 4G capabilities will have an assigned IMEI number. However, a mobile device capable of Wi-Fi, but not having cellular communication capabilities, will not have an IMEI number. As such, one or more other parameter(s) of the Wi-Fi mobile device may be used as the device/user identifiers 124. Such other parameters may include, for example, a MAC address, a login ID, or any other identifier or information available to the Wi-Fi capable device and that is not specific to cellular communications.

By being able to select or access multiple different types of device/user identifiers 124, the AME 108 increases the opportunities for collecting corresponding user information. For example, the AME 108 is not tied to requesting user information from a single source (e.g., only one of the partner database proprietors 104a-b). Instead, the AME 108 can leverage relationships with multiple partner database proprietors (e.g., the partner database proprietors 104a-b). If one or some partner database proprietors are unable or become unwilling to share user data, the AME 108 can request the user data from one or more other partner database proprietor(s).

In some examples, the mobile device 106 may not allow access to identification information stored in the mobile device 106. For such instances, the disclosed examples enable the AME 108 to store an AME-provided identifier (e.g., an identifier managed and tracked by the AME 108) in the mobile device 106 to track media impressions on the mobile device 106. For example, the AME 108 may provide instructions in the data collector 112 to set an AME-provided identifier in memory space accessible by and/or allocated to the app program 116, and the data collector 112 uses the identifier as a device/user identifier 124. In such examples, the AME-provided identifier set by the data collector 112 persists in the memory space even when the app program 116 and the data collector 112 are not running. In this manner, the same AME-provided identifier can remain associated with the mobile device 106 for extended durations. In some examples in which the data collector 112 sets an identifier in the mobile device 106, the AME 108 may recruit a user of the mobile device 106 as a panelist, and may store user information collected from the user during a panelist registration process and/or collected by monitoring user activities/behavior via the mobile device 106 and/or any other device used by the user and monitored by the AME 108. In this manner, the AME 108 can associate user information of the user (from panelist data stored by the AME 108) with media impressions attributed to the user on the mobile device 106.

In the illustrated example, the data collector 112 sends the media ID 122 and the one or more device/user identifier(s) 124 as collected data 126 to the app publisher 110. Alternatively, the data collector 112 may be configured to send the collected data 126 to another collection entity (other than the app publisher 110) that has been contracted by the AME 108 or is partnered with the AME 108 to collect media ID's (e.g., the media ID 122) and device/user identifiers (e.g., the device/user identifier(s) 124) from mobile devices (e.g., the mobile device 106). In the illustrated example, the app publisher 110 (or a collection entity) generates an ACR ID 128 that includes the device/user identifier(s) 124, and the app publisher (or a collection entity) sends the media ID 122 and the ACR ID 128 as impression data 130 to a server 132 at the AME 108. The impression data 130 of the illustrated example may include one media ID 122 and one ACR ID 128 to report a single impression of the media 118, or it may include numerous media ID's and ACR ID's based on numerous instances of collected data (e.g., the collected data 126) received from the mobile device 106 and/or other mobile devices to report multiple impressions of media. In the illustrated example, the server 130 of the illustrated example stores the impression data 130 in an AME media impressions store 134 (e.g., a database or other data structure). Subsequently, the AME 108 sends the device/user identifier(s) 124 from the ACR ID 128 to corresponding partner database proprietors (e.g., the partner database proprietors 104*a-b*) to receive user information (e.g., the user information 102*a-b*) corresponding to the device/user identifier(s) 124 from the partner database proprietors so that the AME 108 can associate the user information with corresponding media impressions of media (e.g., the media 118) presented at mobile devices (e.g., the mobile device 106).

Although the above description describes the app publisher 110 (or other collection entity) as generating the ACR ID 128, in other examples, the data collector 112 at the mobile device 106 generates the ACR ID 128 that includes the device/user identifier(s) 124. In such examples, the data collector 112 sends the ACR ID 128 to the app publisher 110 (or other collection entity) in the collected data 126.

In the illustrated example, to protect the privacy of the user of the mobile device 106, the device/user identifier(s) 124 is/are encrypted before sending it/them to the AME 108 in the ACR ID 128. In the illustrated examples, the encryption process is performed so that neither the app publisher (110) (or other collection entity) nor the AME 108, or any other intermediate entity, can access the device/user identifier(s) 124 before they are sent to corresponding partner database proprietors (e.g., the partner database proprietors 104*a-b*). To encrypt the device/user identifier(s) 124, each partner database proprietor (e.g., the partner database proprietors 104*a-b*) for which identification information can be retrieved from the mobile device 106 is provided with one or more encryption keys specific to that partner database proprietor. In this manner, each partner database proprietor has a different set of keys so that each partner database proprietor can only recover one or more of the device/user identifier(s) 124 that pertain(s) to it. For example, a wireless service carrier can only retrieve an IMEI or MEID number, a social network site can only retrieve a login username corresponding to its social network services, etc. Copies of the one or more encryption keys can be provided to the app publisher 110 in an encryption algorithm (e.g., an SSH-1 encryption algorithm). In the illustrated example, the AME 108 provides the encryption algorithm and the encryption keys to the app publisher 110 as an encryption software package or bundle (e.g., an encryptor 202 of FIG. 2) from which the app publisher 110 cannot recover or extract the encryption keys. In this manner, the app publisher 110 is not able to access the device/user identifier(s) 124. In other examples, the app publisher 110 is able to access the device/user identifier(s) 124 if authorized by a user of the mobile device 106 (e.g., during installation of the app program 116). In such examples, the app publisher 110 may still encrypt the device/user identifier(s) 124 before sending them to the AME 108.

In the illustrated examples, the encryption algorithm is also provided with partner database proprietor identifiers along with corresponding ones of the encryption keys for each of the partner database proprietors (e.g., the partner database proprietors 104*a-b*). When encrypting the device/user identifier(s) 124, the encryption algorithm can append, prepend, concatenate, or otherwise associate corresponding partner database proprietor identifiers to or with the encrypted device/user identifier(s) (e.g., encrypted device/user identifier(s) 208*a-b* of FIG. 2) so that the AME 108 can access the partner database proprietor identifiers, without decrypting the encrypted device/user identifier(s), to identify which of the encrypted device/user identifier(s) corresponds to which partner database proprietor. In this manner, the AME 108 can deliver the encrypted device/user identifier(s) to corresponding partner database proprietor(s) even though it cannot decrypt the device/user identifier(s) 124.

In some examples, the app publisher 110 can run the encryption software at one of its servers or computers that receives the collected data 126 from the mobile device 106. In such examples, the media ID 122 and the device/user identifier(s) 124 are sent by the mobile device 106 as the collected data 126 via a secure connection between the encryption software running at the app publisher 110 and the mobile device 106. In this manner, the device/user identifier(s) 124 is/are not intercepted by the app publisher 110 before they are encrypted using the encryption keys corresponding to the different database proprietors.

In other examples, the encryption software to encrypt the device/user identifier(s) 124 is provided in the data collector 112 so that the data collector 112 can encrypt the device/user identifier(s) 124 at the mobile device 106 before sending encrypted device/user identifier(s) to the app publisher 110 (or other collection entity). In some examples in which the data collector 112 encrypts the device/user identifier(s) 124, the data collector 112 also encodes the encrypted device/user identifier(s) into an ACR ID (e.g., the ACR ID 128). In such examples, the data collector 112 sends the ACR ID 128 and the media ID 122 to the app publisher 110 (or other collection entity) in the collected data 126.

After the AME 108 receives the ACR ID 128 including the device/user identifier(s) 124 in encrypted format, the AME 108 sends encrypted device/user identifier logs 136*a-b* to corresponding partner database proprietors (e.g., the partner database proprietors 104*a-b*). In the illustrated example, each of the encrypted device/user identifier logs 136*a-b* may include a single encrypted device/user identifier, or it may include numerous aggregate encrypted device/user identifiers received over time from one or more mobile devices. After receiving the encrypted device/user identifier logs 136*a-b*, each of the partner database proprietors 104*a-b* decrypts its respective encrypted device/user identifiers using its copy(ies) of the encryption key(s). The partner database proprietors 104*a-b* then look up their users corresponding to the decrypted device/user identifiers, and collect corresponding user information 102*a-b* for those users for sending to the AME 108. For example, if the partner database proprietor 104*a* is a wireless service provider, the encrypted device/user identifier log 136a includes IMEI numbers, and the wireless service provider accesses its subscriber records to find users having IMEI numbers matching the IMEI numbers received in the encrypted device/user identifier log 136a. When the users are identified, the wireless service provider copies the users' user information to the user information 102a for delivery to the AME 108.

Figure 9:
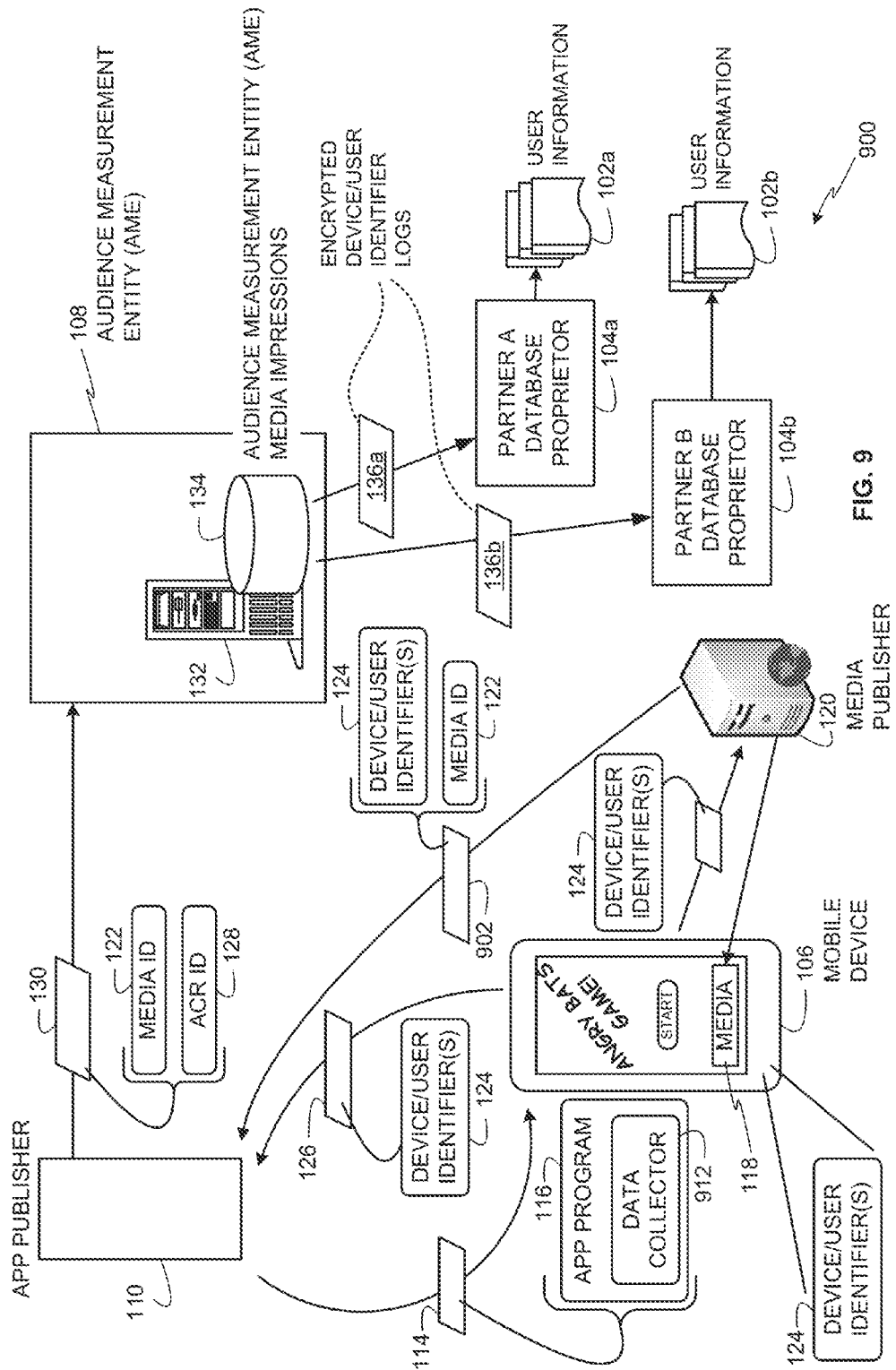
FIG. 9 depicts another example system to collect user information from distributed database proprietors for associating with impressions of media presented at mobile devices.

FIG. 9 depicts another example system 900 to collect user information (e.g., the user information 102a and 102b) from distributed database proprietors 104a and 104b for associating with impressions of media presented at the mobile device 106. In the illustrated example of FIG. 9, like reference numbers are used to refer to the same or similar components as described above in connection with FIG. 1. In the illustrated example of FIG. 9, a data collector 912 is shown as being located in the app program 116. For example, the data collector 912 may include instructions coded in the app program 116 to collect data in the mobile device 106. Alternatively, the data collector 912 may be a separate program downloaded separate from the app program 116 as part of the app install package 114 from the app publisher 110.

In the illustrated example of FIG. 9, the data collector 912 is configured to collect the device/user identifier(s) 124 from the mobile device 106. The example data collector 912 sends the device/user identifier(s) 124 to the app publisher 110 in the collected data 126, and it also sends the device/user identifier(s) 124 to the media publisher 120. The data collector 912 of the illustrated example does not collect the media ID 122 from the media 118 at the mobile device 106 as the data collector 112 does in the example system 100 of FIG. 1. Instead, the media publisher 120 that publishes the media 118 to the mobile device 106 retrieves the media ID 122 from the media 118 that it publishes. The media publisher 120 then associates the media ID 122 to the device/user identifier(s) 124 of the mobile device 106, and sends collected data 902 to the app publisher 110 that includes the media ID 122 and the associated device/user identifier(s) 124 of the mobile device 106. For example, when the media publisher 120 sends the media 118 to the mobile device 106, it does so by identifying the mobile device 106 as a destination device for the media 118 using one or more of the device/user identifier(s) 124. In this manner, the media publisher 120 can associate the media ID 122 of the media 118 with the device/user identifier(s) 124 of the mobile device 106 indicating that the media 118 was sent to the particular mobile device 106 for presentation (e.g., to generate an impression of the media 118).

In the illustrated example, the app publisher 110 matches the device/user identifier(s) 124 from the collected data 902 to the device/user identifier(s) 124 from the collected data 126 to determine that the media ID 122 corresponds to media (e.g., the media 118) presented on the mobile device 106 associated with the device/user identifier(s) 124. The app publisher 110 of the illustrated example also generates an ACR ID 128 based on the device/user identifier(s) 124 as disclosed herein. The app publisher 110 then sends the impression data 130, including the media ID 122 and the associated ACR ID 128, to the AME 108. The AME 108 can then send the encrypted device/user identifier logs 136a-b to the partner database proprietors 104a-b to request the user information 102a-b as described above in connection with FIG. 1.

Figure 10:
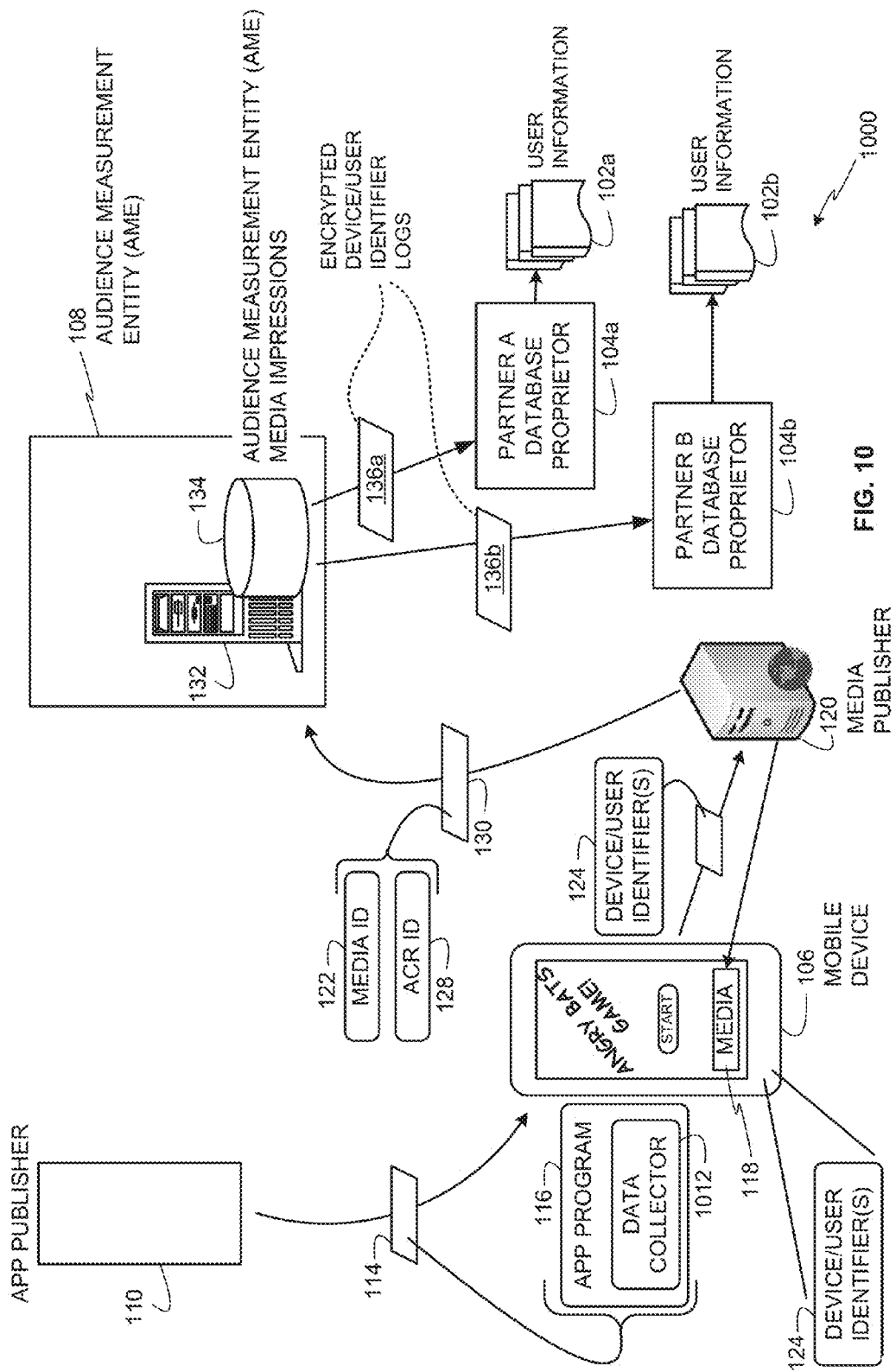
FIG. 10 depicts yet another example system to collect user information from distributed database proprietors for associating with impressions of media presented at mobile devices.

FIG. 10 depicts yet another example system 1000 to collect user information (e.g., the user information 102a and 102b) from distributed database proprietors 104a and 104b for associating with impressions of media presented at the mobile device 106. In the illustrated example of FIG. 10, like reference numbers are used to refer to the same or similar components as described above in connection with FIG. 1. In the illustrated example of FIG. 10, a data collector 1012 is shown as being located in the app program 116. For example, the data collector 1012 may include instructions coded in the app program 116 to collect data in the mobile device 106. Alternatively, the data collector 1012 may be a separate program downloaded separate from the app program 116 as part of the app install package 114 from the app publisher 110.

In the illustrated example of FIG. 10, the data collector 1012 is configured to collect the device/user identifier(s) 124 from the mobile device 106. The example data collector 1012 sends the device/user identifier(s) 124 to the media publisher 120. The data collector 1012 of the illustrated example does not collect the media ID 122 from the media 118 at the mobile device 106 as the data collector 112 does in the example system 100 of FIG. 1. Instead, the media publisher 120 that publishes the media 118 to the mobile device 106 retrieves the media ID 122 from the media 118 that it publishes. The media publisher 120 then associates the media ID 122 to the device/user identifier(s) 124 of the mobile device 106, and generates the ACR ID 128 based on the device/user identifier(s) 124 as disclosed herein. The media publisher 120 then sends the media impression data 130, including the media ID 122 and the ACR ID 128, to the AME 108. For example, when the media publisher 120 sends the media 118 to the mobile device 106, it does so by identifying the mobile device 106 as a destination device for the media 118 using one or more of the device/user identifier(s) 124. In this manner, the media publisher 120 can associate the media ID 122 of the media 118 with the device/user identifier(s) 124 and the ACR ID 128 of the mobile device 106 indicating that the media 118 was sent to the particular mobile device 106 for presentation (e.g., to generate an impression of the media 118). In the illustrated example, after the AME 108 receives the impression data 130 from the media publisher 120, the AME 108 can then send the encrypted device/user identifier logs 136a-b to the partner database proprietors 104a-b to request the user information 102a-b as described above in connection with FIG. 1.

Although the media publisher 120 is shown separate from the app publisher 110 in FIGS. 1, 9, and 10, the app publisher 110 may implement at least some of the operations of the media publisher 120 to send the media 118 to the mobile device 106 for presentation. For example, advertisement, content, or other media providers may send media (e.g., the media 118) to the app publisher 110 for publishing to the mobile device 106 via, for example, the app program 116 when it is executing on the mobile device 106. In such examples, the app publisher 110 implements the operations described above as being performed by the media publisher 120.

In some examples, the media publisher 120 operates as a third-party media publisher relative to other traditional media publishers. In such examples, the media publisher 120 receives media from media providers and/or other traditional media publishers for publishing to electronic devices (e.g., the mobile device 106) while tracking media impressions of the published media (e.g., the media 118) and/or identities of devices to which media is published. That is, in addition to performing traditional media publisher services of publishing media to electronic devices, the media publisher 120 of the illustrated example additionally collects media impression tracking information as discussed above in connection with FIGS. 9 and 10. Thus, in some examples, the media publisher 120 is a third party that is contracted by traditional media publishers to provide media impression tracking capabilities for collecting media impressions and user information (e.g., the user information 102*a-b*) as disclosed herein.

In addition to associating user information (e.g., the user information 102*a-b*) with media IDs (e.g., the media ID 122) of published media, examples disclosed herein may additionally or alternatively be used to associate user information with other types of information collected from mobile devices representative of user interests and/or user behaviors. For example, techniques disclosed herein may also be used to monitor search terms provided by users at mobile devices, and associating those search terms with user information of users that provide the search terms. Example search terms may be provided via apps downloaded and installed on mobile devices, for searching information on the Internet and/or products at stores, websites, etc. For example, a search term may cause a search to be performed for information on the Internet, a search to be performed for a product, a search of a website to be performed, or a search for a website to be performed. Example systems that may be used to monitor search terms are described below in connection with FIGS. 12-14. In the illustrated examples of FIGS. 12-14, like reference numbers are used to refer to the same or similar components as described above in connection with FIG. 1.

Figure 12:
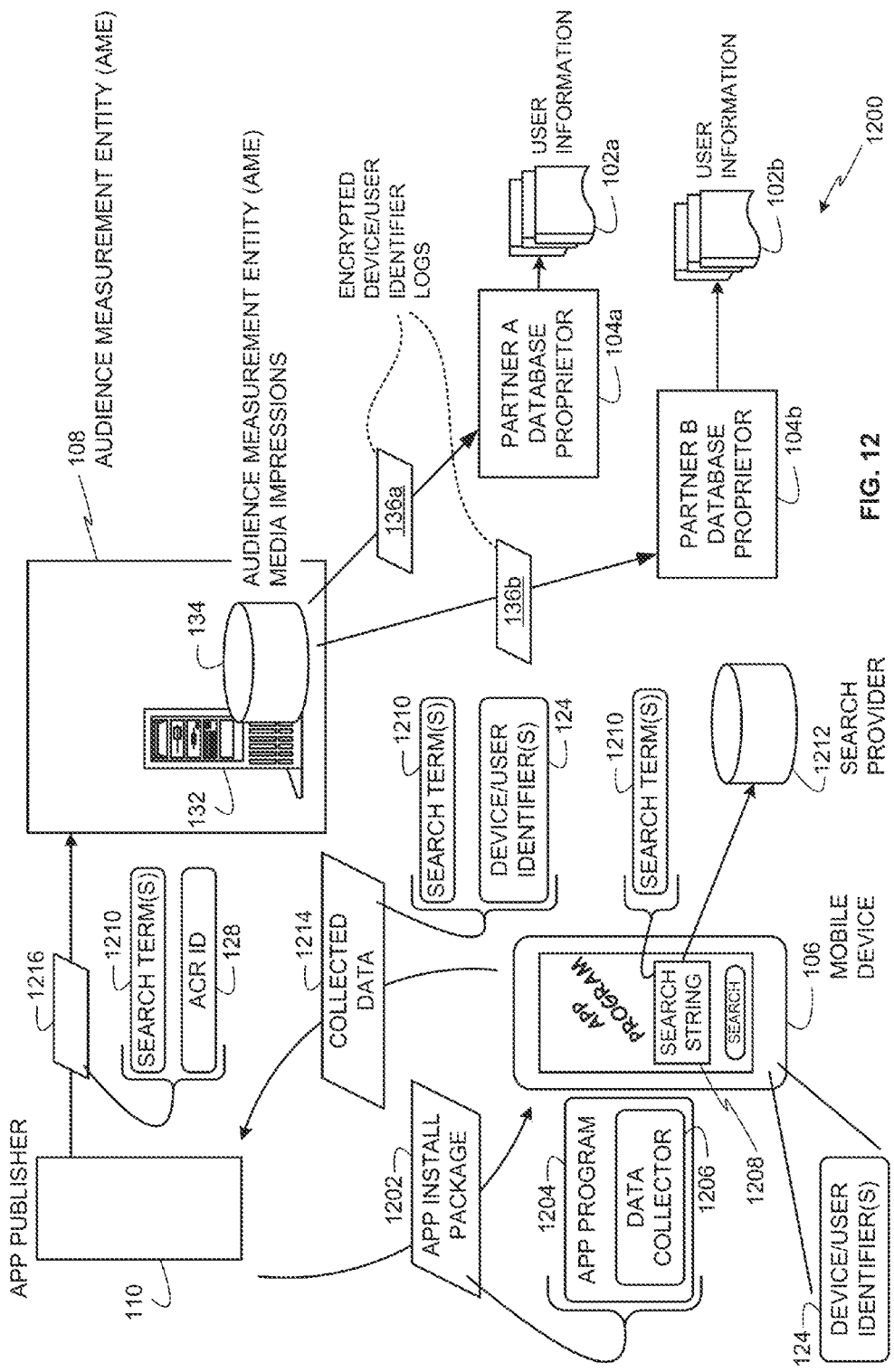
FIG. 12 is an example system to collect user information from distributed database proprietors for associating with search terms provided by users at mobile devices.

FIG. 12 is an example system 1200 to collect user information (e.g., the user information 102*a* and 102*b*) from distributed database proprietors 104*a-b* for associating with search terms (e.g., search terms 1210) provided by users at mobile devices (e.g., the mobile device 106). In the illustrated example of FIG. 12, a data collector 1206 is shown as being located in an app program 1204 downloaded to the mobile device 106 in an app install package 1202 from the app publisher 110. For example, the data collector 1206 may include instructions coded in the app program 1204 to collect data in the mobile device 106. Alternatively, the data collector 1206 may be a separate program downloaded separate from the app program 1204 as part of the app install package 1202 from the app publisher 110.

In the illustrated example of FIG. 12, the app program 1204 provides search functionality so that users may search, for example, information on the Internet, products, services, etc. For example, when executing on the mobile device 106, the app program 1204 provides a search field 1208 for entering a search string including one or more search term(s) 1210. To provide the search functionality, the app program 1204 of the illustrated example sends the search term(s) 1210 to a search service provider 1212. In this manner, the search service provider 1212 can perform the requested search, and return search results to the app program 1204 at the mobile device 106. In the illustrated example, the search service provider 1212 may be an Internet search engine (e.g., Google, Yahoo!, Bing, etc.), an Internet portal website, a retailer, etc.

When a user provides the search term(s) 1210 in the search field 1208, the data collector 1206 sends the search term(s) 1210, and the device/user identifier(s) 124 to the app publisher 110 as collected data 1214. The app publisher 110 can then generate the ACR ID 128 based on the device/user identifier(s) 124 using example techniques disclosed herein, and send the search term(s) 1210 and the ACR ID 128 to the AME 108 as user-interest data 1216. In other examples, the data collector 1206 may be configured to send the search term(s) 1210 and the ACR ID 128 (or the device/user identifier(s) 124) as the user-interest data 1216 directly to the AME 108. The AME 108 can then send the encrypted device/user identifier logs 136*a-b* to the partner database proprietors 104*a-b* to request the user information 102*a-b* as described above in connection with FIG. 1.

Figure 13:
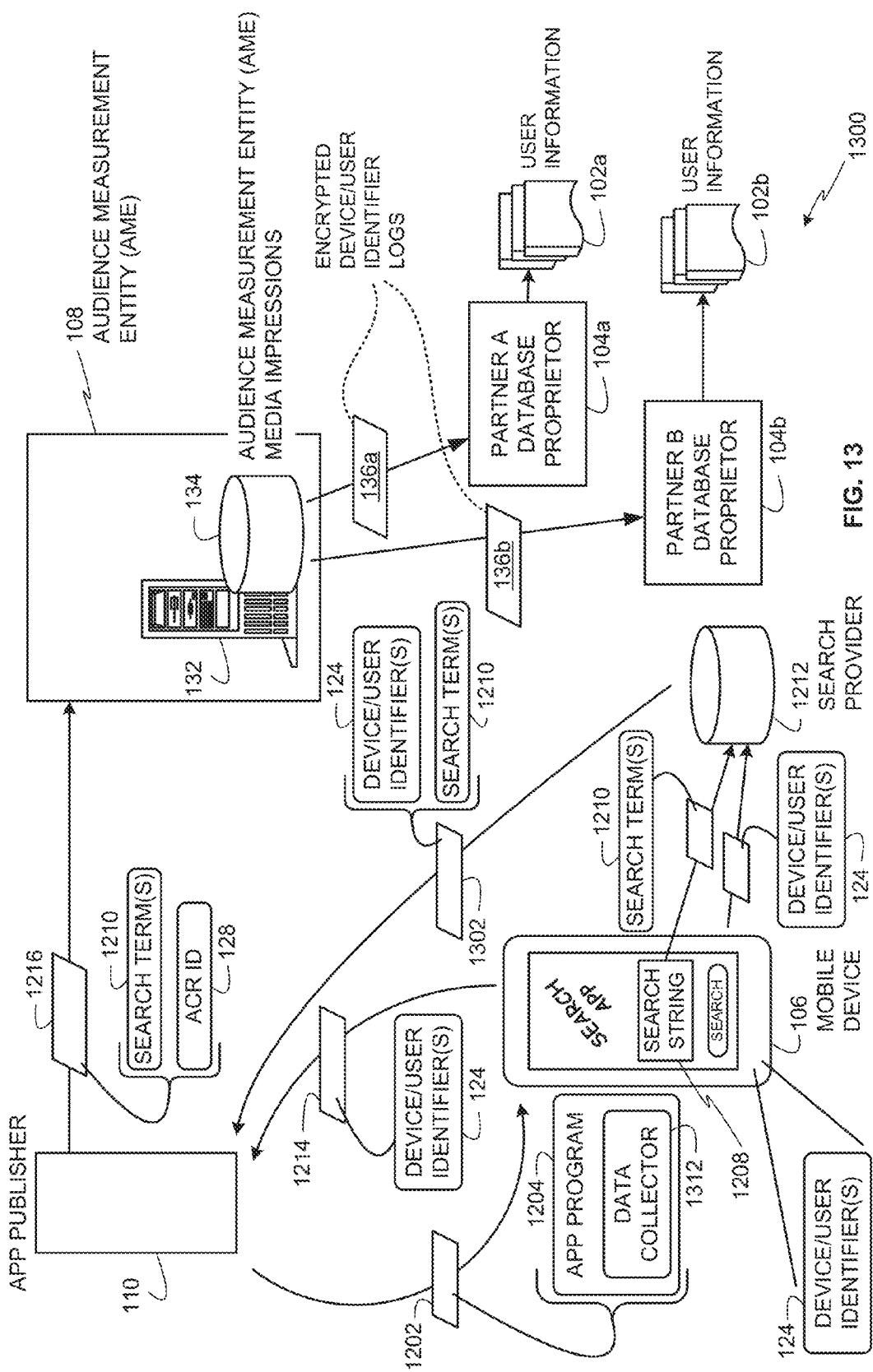
FIG. 13 depicts another example system to collect user information from distributed database proprietors for associating with search terms provided by users at mobile devices.

FIG. 13 depicts another example system 1300 to collect user information (e.g., the user information 102*a* and 102*b*) from distributed database proprietors 104*a-b* for associating with search terms (e.g., the search term(s) 1210) provided by users at mobile devices. In the illustrated example of FIG. 13, a data collector 1312 is shown as being located in the app program 1204. For example, the data collector 1312 may include instructions coded in the app program 1204 to collect data in the mobile device 106. Alternatively, the data collector 1312 may be a separate program downloaded separate from the app program 1204 as part of the app install package 1202 from the app publisher 110.

In the illustrated example of FIG. 9, the data collector 1312 is configured to collect the device/user identifier(s) 124 from the mobile device 106. The example data collector 1312 sends the device/user identifier(s) 124 to the app publisher 110 in the collected data 1214, and it also sends the device/user identifier(s) 124 to the search provider 1212. The data collector 1312 of the illustrated example does not collect the search terms 1210 from the search field 1208 at the mobile device 106 as the data collector 1206 does in the example system 1200 of FIG. 12. Instead, the search provider 1212 collects the search term(s) 1210 when received from the app program 1204. The search provider 1212 then associates the search term(s) 1210 with the device/user identifier(s) 124 of the mobile device 106, and sends collected data 1302 to the app publisher 110 that includes the search term(s) 1210 and the associated device/user identifier(s) 124 of the mobile device 106. For example, when the search provider 1212 provides services to the mobile device 106, it does so by identifying the mobile device 106 using one or more of the device/user identifier(s) 124. In this manner, the search provider 1212 can associate the search term(s) 1210 with the device/user identifier(s) 124 of the mobile device 106 indicating which searches are performed for the particular mobile device 106.

In the illustrated example, the app publisher 110 matches the device/user identifier(s) 124 from the collected data 1302 to the device/user identifier(s) 124 from the collected data 126 to determine that the search term(s) 1210 correspond to a search provided for the mobile device 106 associated with the device/user identifier(s) 124. The app publisher 110 of the illustrated example also generates an ACR ID 128 based on the device/user identifier(s) 124 as disclosed herein. The app publisher 110 then sends the user-interest data 1216, including the search term(s) 1210 and the associated ACR ID 128, to the AME 108. The AME 108 can then send the encrypted device/user identifier logs 136*a-b* to the partner database proprietors 104*a-b* to request the user information 102*a-b* as described above in connection with FIG. 1.

Figure 14:
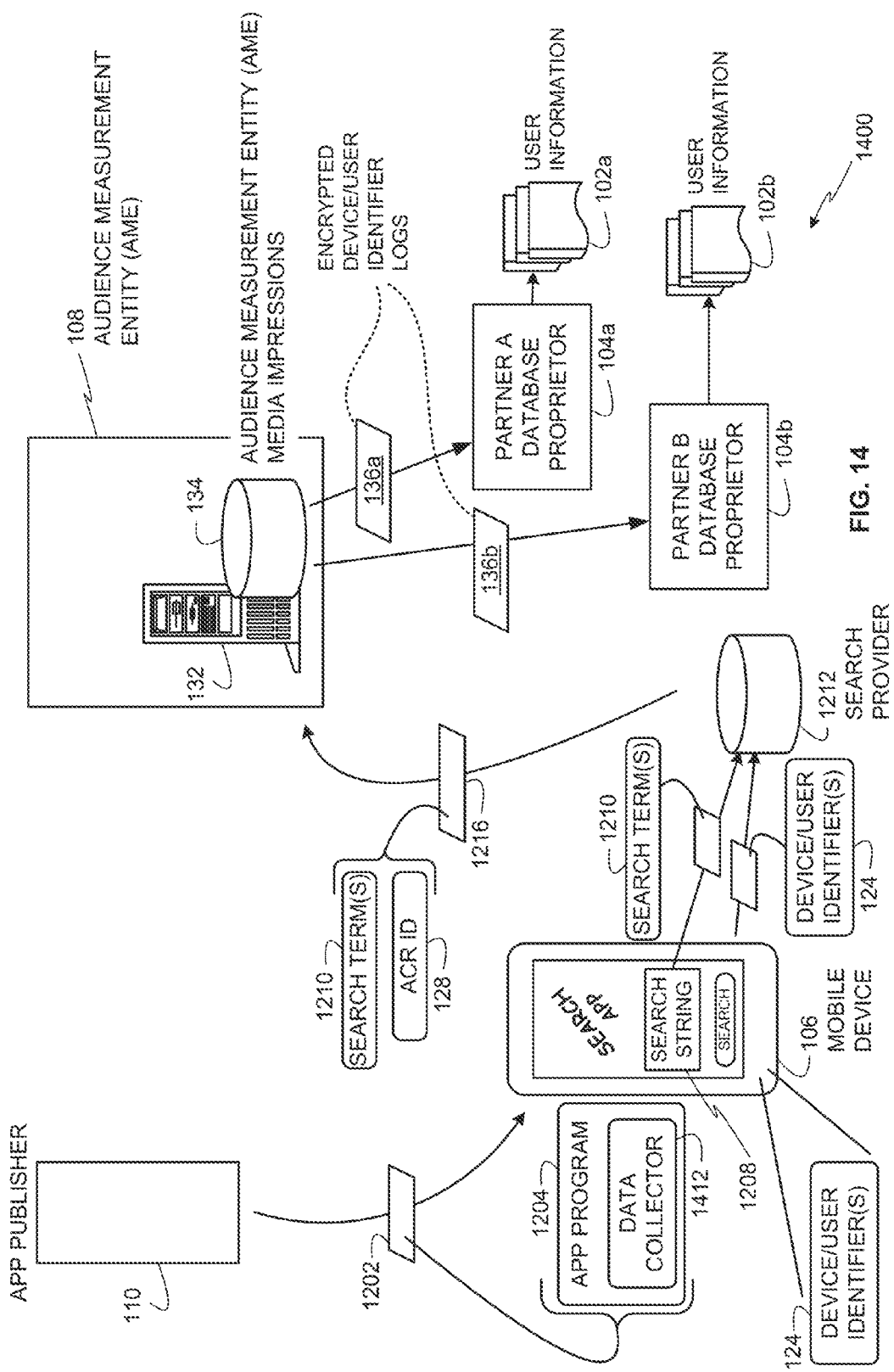
FIG. 14 depicts yet another example system to collect user information from distributed database proprietors for associating with search terms provided by users at mobile devices.

FIG. 14 depicts yet another example system 1400 to collect user information (e.g., the user information 102*a* and 102*b*) from distributed database proprietors 104*a* and 104*b* for associating with the search term(s) 1210 provided at the mobile device 106. In the illustrated example of FIG. 14, a data collector 1412 is shown as being located in the app program 1204. For example, the data collector 1412 may include instructions coded in the app program 1204 to collect data in the mobile device 106. Alternatively, the data collector 1412 may be a separate program downloaded separate from the app program 1204 as part of the app install package 1202 from the app publisher 110.

In the illustrated example of FIG. 14, the data collector 1412 is configured to collect the device/user identifier(s) 124 from the mobile device 106. The example data collector 1412 sends the device/user identifier(s) 124 to the search provider 1212. The data collector 1412 of the illustrated example does not collect the search term(s) 1210 from the search field 1208 at the mobile device 106 as the data collector 1206 does in the example system 1200 of FIG. 12. Instead, the search provider 1212 retrieves the search term(s) 1210 when received from the app program 1205 executing on the mobile device 106. The search provider 1212 then associates the search term(s) 1210 to the device/user identifier(s) 124 of the mobile device 106, and generates the ACR ID 128 based on the device/user identifier(s) 124 as disclosed herein. The search provider 1212 then sends the user-interest data 1216, including the search term(s) 1210 and the ACR ID 128, to the AME 108. For example, when the search provider 1212 provides search services to the mobile device 106, it does so by identifying the mobile device 106 using one or more of the device/user identifier(s) 124. In this manner, the search provider 1212 can associate the search term(s) 1210 with the device/user identifier(s) 124 and the ACR ID 128 of the mobile device 106 indicating that the search was performed for the particular mobile device 106. In other examples, the data collector 1412 at the mobile device 106 may be configured to send the search term(s) 1210 and the ACR ID 128 (or the device/user identifier(s) 124) as the user-interest data 1216 directly to the AME 108. In the illustrated example, after the AME 108 receives the user-interest data 1216 from the search provider 1212 (or from the mobile device 106), the AME 108 can then send the encrypted device/user identifier logs 136a-b to the partner database proprietors 104a-b to request the user information 102a-b as described above in connection with FIG. 1.

Although the search provider 1212 is shown separate from the app publisher 110 in FIGS. 1, 9, and 10, the app publisher 110 may implement at least some operations of the search provider 1212 to receive the search term(s) 1210 from the mobile device 106. For example, the data collector 1412 may send the search term(s) 1210 to the app publisher 110 so that the app publisher 110 may forward the search term(s) 1210 on to a search provider. In such examples, the app publisher 110 implements at least some of the operations described above as being performed by the search provider 1212.

Figure 2:
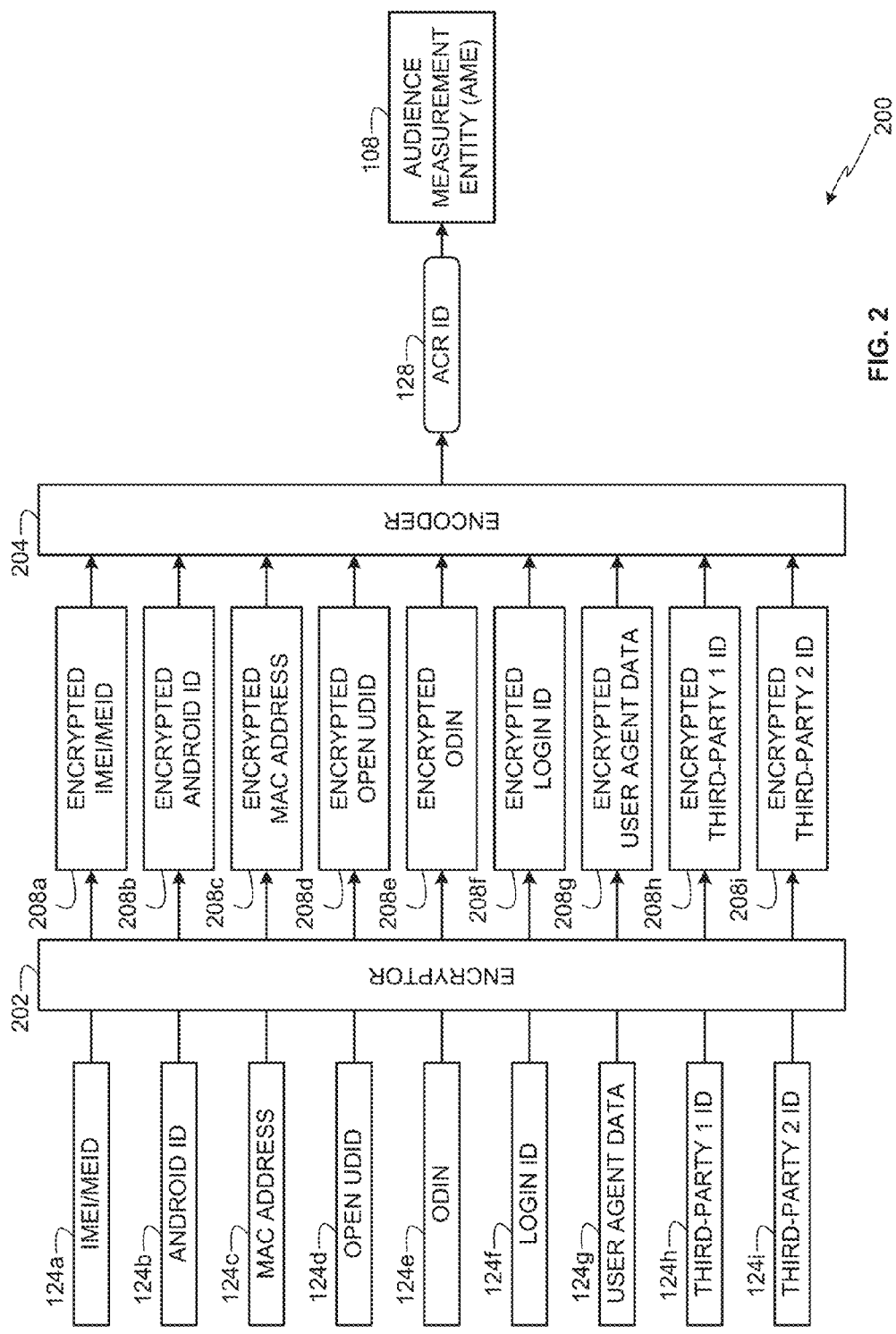
FIG. 2 depicts an example apparatus to encrypt device and/or user identifiers, and encode the encrypted device and/or user identifiers into an application campaign rating (ACR) identifier.

FIG. 2 depicts an example apparatus 200 having an encryptor 202 to encrypt device and/or user identifiers (e.g., the device/user identifier(s) 124 of FIG. 1), and having an encoder 204 to encode the encrypted device and/or user identifiers into an application campaign rating (ACR) identifier (e.g., the ACR ID 128 of FIGS. 1, 9, 10, and 12-14). The encryptor 202 of the illustrated example is provided with encryption keys and partner database proprietor identifiers corresponding to the different partner database proprietors (e.g., partner database proprietors 104a-b of FIGS. 1, 9, 10, and 12-14) for which device/user identifiers 124 (FIGS. 1, 9, 10, and 12-14) can be collected from mobile devices. In the illustrated example, device and/or user identifiers (e.g., the device/user identifier(s) 124 of FIGS. 1, 9, 10, and 12-14) include an IMEI/MEID number 124a, an Android ID 124b, a MAC address 124c, an OpenUDID 124d, an ODIN identifier 124e, a login ID 124f, user agent data 124g, a third-party 1 ID 124h, and a third-party 2 ID 124i. In the illustrated examples, the third-party 1 ID 124h and/or the third-party 2 ID 124i may be identifiers of targeted advertisement services, web analytics services, services that collect and store demographic information of users in association with unique identifiers (e.g., the third-party 1 ID 124h and/or the third-party 2 ID 124i) of those users. The encryptor 202 of the illustrated example uses corresponding encryption keys to encrypt the device/user identifiers 124 to corresponding encrypted device/user identifiers 208a-i. In addition, the encryptor 202 also provides (e.g., appends, prepends, or otherwise concatenates) corresponding partner database proprietor identifiers to corresponding ones of the encrypted device/user identifiers 208a-i so that the AME 108 can identify partner database proprietors (e.g., the partner database proprietors 104a-b of FIGS. 1, 9, 10, and 12-14) to which it should send corresponding ones of the encrypted device/user identifiers 208a-i. The encoder 204 of the illustrated example encodes the encrypted device/user identifiers 208a-i into the ACR ID 128. The ACR ID 128 is then sent to the AME 108.

The example apparatus 200 may be entirely or partially implemented at the mobile device 106 (FIGS. 1, 9, 10, and 12-14), entirely or partially implemented at the app publisher 110 (FIGS. 1, 9, 10, and 12-14) (or other collection entity), and/or entirely or partially implemented at the media publisher 120 (FIGS. 1, 9, and 10) (or search provider 1212 of FIGS. 12-14). In some examples, the encryptor 202 and the encoder 204 may both be implemented in the mobile device 106, to generate the ACR ID 128 and send the ACR ID 128 to the app publisher 110 (or other collection entity) in the collected data 126 along with the media ID 122 (and/or the search term(s) 1210). In other examples, the encryptor 202 may be implemented at the mobile device 106, and the encoder 204 may be implemented at the app publisher 110 (or other collection entity), at the media publisher 120, and/or at the search provider 1212. For example, the encryptor 202 may be provided in encryption software downloaded to the mobile device 106 as part of the data collector 112. In this manner, the encryptor 202 can encrypt the device/user identifier(s) 124 at the mobile device 106, and send the encrypted device/user identifier(s) 208a-i to the app publisher 110 (or other collection entity), to the media publisher 120, and/or to the search provider 1212. The encoder 204 can then be used at the app publisher 110 (or other collection entity), at the media publisher 120, and/or at the search provider 1212 to generate the ACR ID 128 by encoding the encrypted device/user identifier(s) 208a-i into the ACR ID 128, and the app publisher 110 (or other collection entity), the media publisher 120, and/or the search provider 1212 sends the ACR ID 128 to the AME 108 along with the media ID 122 (e.g., as the impression data 130 of FIGS. 1, 9, and 10) or the search term(s) 1210 (e.g., as the user-interest data 1216).

In other examples, both of the encryptor 202 and the encoder 204 are implemented at the app publisher 110 (or other collection entity), at the media publisher 120, and/or at the search provider 1212. In such other examples, the app publisher 110 (or other collection entity), the media publisher 120, and/or the search provider 1212 receive(s) the device/user identifier(s) 124 from the mobile device 106. The app publisher 110 (or other collection entity), the media publisher 120, and/or the search provider 1212 generate(s) the ACR ID 128 to include the encrypted device/user identifier(s) 208a-i. The app publisher 110 (or other collection entity), the media publisher 120, and/or the search provider 1212 can then send the ACR ID 128 to the AME 108 along with the media ID 122 (e.g., as the impression data 130 of FIGS. 1, 9, and 10) or the search term(s) 1210 (e.g., as the user-interest data 1216 of FIGS. 12-14).

Figure 3:
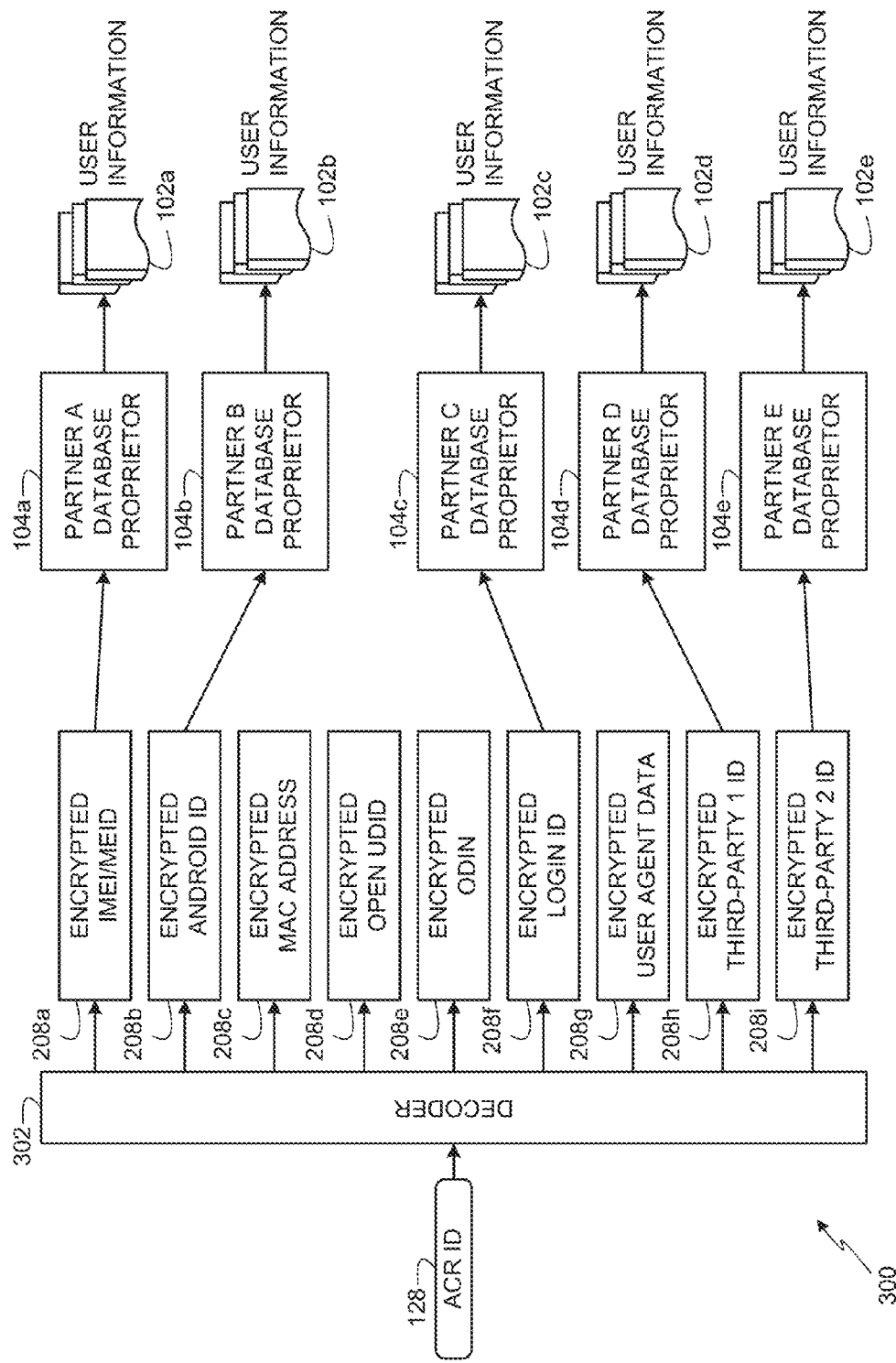
FIG. 3 depicts an example apparatus to decode encrypted device and/or user identifiers from the ACR identifier of FIG. 2, and send the encrypted device and/or user identifiers to corresponding database proprietors to request user information associated with the encrypted device and/or user identifiers.

FIG. 3 depicts an example apparatus 300 to decode encrypted device and/or user identifiers 208a-i (FIG. 2) from the ACR ID 128 of FIGS. 1, 2, 9, 10, and 12-14, and send one or more of the encrypted device and/or user identifiers 208a-i to corresponding partner database proprietors 104a-e to request user information 102a-e associated with the encrypted device and/or user identifiers 208a-i. The apparatus 300 of the illustrated example includes a decoder 302 to decode the encrypted device and/or user identifiers 208a-i from the ACR ID 128. In the illustrated examples, the decoder 302 is implemented at the AME 108 of FIG. 1 (e.g., at the server 132 of the AME 108). The decoder 302 of the illustrated example determines which of the partner database proprietors 104a-e correspond to which of the encrypted device/user identifiers 208a-i based on, for example, partner database proprietor identifiers provided to the encrypted device/user identifiers 208a-i by the encryptor 202 of FIG. 2. The decoder 302 then sends corresponding ones of the encrypted device and/or user identifiers 208a-i to corresponding partner database proprietors 104a-e.

Figure 4:
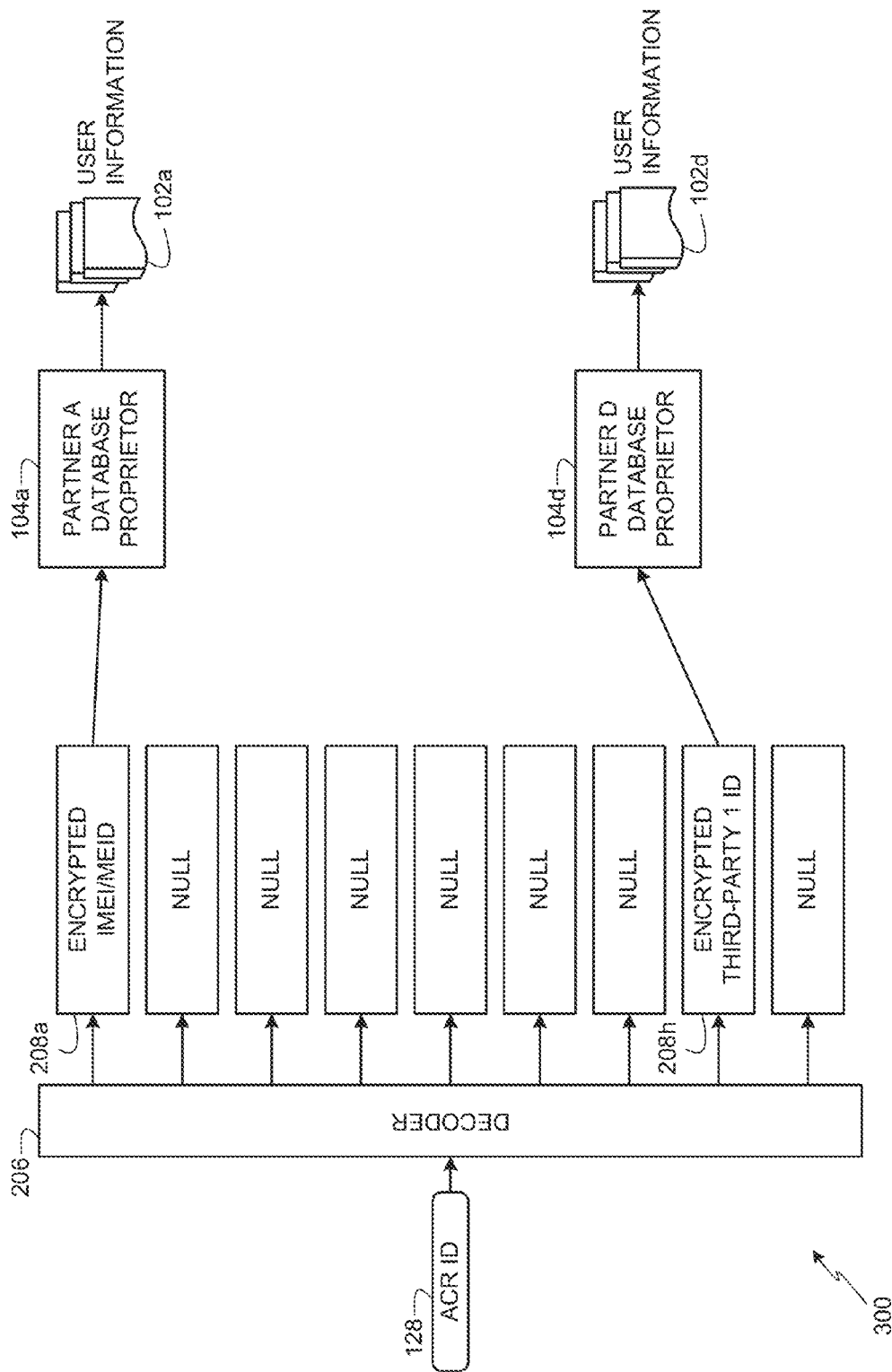
FIG. 4 depicts the example apparatus of FIG. 3 decoding an ACR identifier having some empty fields that do not contain any device and/or user identifiers.

FIG. 4 depicts the example apparatus 300 of FIG. 3 decoding the ACR ID 128 in an example in which the ACR ID 128 has some empty fields that do not contain any encrypted device and/or user identifiers. In the illustrated example of FIG. 4, the decoder 302 decodes the encrypted device and/or user identifiers 208a and 208h which are located in the ACR ID 128, sends the encrypted device and/or user identifier 208a to the corresponding partner database proprietor 208a, and sends the encrypted device and/or user identifier 208h to the corresponding partner database proprietor 208h. Thus, although nine encrypted device and/or user identifiers 208a-i are shown in FIG. 3, in some examples, fewer (e.g., less than nine) encrypted device and/or user identifiers may be located in the ACR ID 128 such as in FIG. 4. In yet other examples, more than nine encrypted device and/or user identifiers may be encoded into the ACR ID 128.

While example manners of implementing the apparatus 200 and the apparatus 300 have been illustrated in FIGS. 2-4, one or more of the elements, processes and/or devices illustrated in FIGS. 2-4 may be combined, divided, re-arranged, omitted, eliminated and/or implemented in any other way. Further, the example encryptor 202, the example encoder 204, the example decoder 302 and/or, more generally, the example apparatus 200 and/or 300 may be implemented using hardware, software, firmware and/or any combination of hardware, software and/or firmware. Thus, for example, any of the example encryptor 202, the example encoder 204, the example decoder 302 and/or, more generally, the example apparatus 200 and/or 300 could be implemented using one or more analog or digital circuit(s), logical circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example encryptor 202, the example encoder 204, and/or the example decoder 302 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 200 of FIG. 2 and/or the example apparatus 300 of FIGS. 3 and 4 may include one or more elements, processes and/or devices in addition to, or instead of, those illustrated in FIGS. 2-4, and/or may include more than one of any or all of the illustrated elements, processes and devices.

FIGS. 5, 11, 15, 6, and 7 are flow diagrams representative of machine readable instructions that may be executed to track media impressions and/or search terms and collect distributed user information for the media impressions and/or search terms using examples disclosed herein. In the examples of FIGS. 5, 11, 15, 6, and 7, operations and processes are shown that represent machine readable instructions comprising one or more programs for execution by one or more processors such as the processor 812 shown in the example computer 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program(s) and/or parts thereof could alternatively be executed by a device other than processor(s) such as the processor 812 and/or embodied in firmware or dedicated hardware. Further, although the example program(s) is/are disclosed herein with reference to the illustrated examples of FIGS. 5, 11, 15, 6, and 7, many other methods of implementing example apparatus 200 and 300 disclosed herein may alternatively be used. For example, the order of execution of the processes and/or operations may be changed, and/or some of the processes and/or operations disclosed herein may be changed, eliminated, or combined.

As mentioned above, example processes and/or operations of FIGS. 5, 11, 15, 6, and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes and/or operations of FIGS. 5, 11, 15, 6, and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 5:
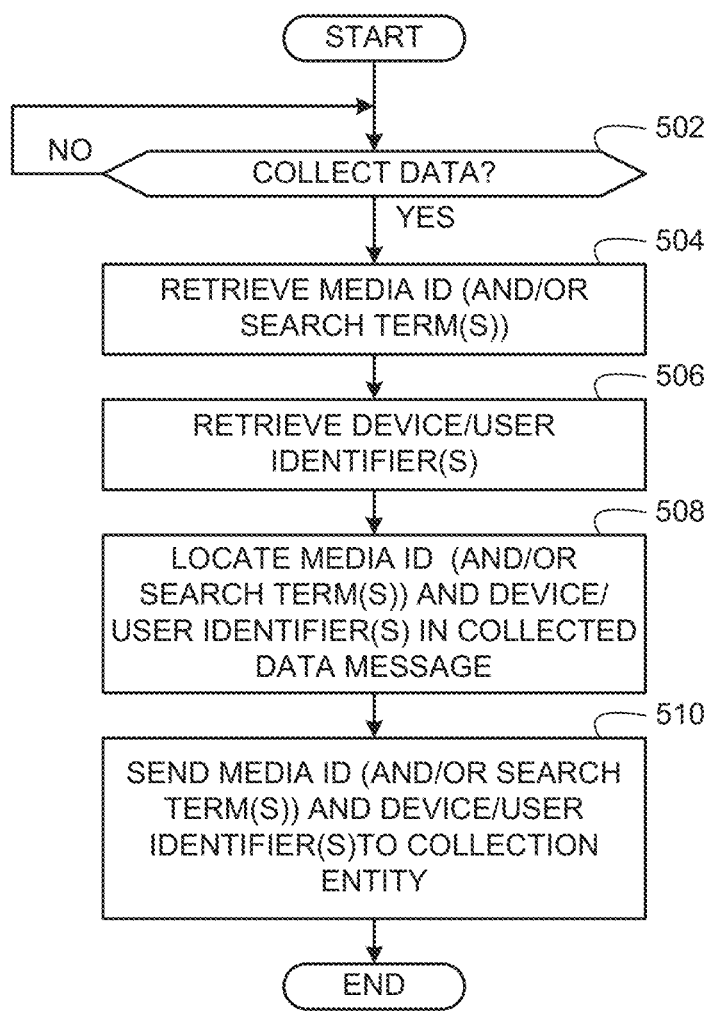
FIG. 5 is a flow diagram representative of example machine readable instructions that may be executed to collect media identifiers and device and/or user identifiers at mobile devices.

FIG. 5 is a flow diagram of an example process that may be used to collect media identifiers (e.g., the media ID 122 of FIG. 1) and device and/or user identifiers (e.g., the device/user identifiers 124 of FIGS. 1 and 2) at mobile devices (e.g., the mobile device 106 of FIG. 1). In some examples, instead of or in addition to collecting media identifiers, the example process of FIG. 5 may additionally or alternatively be used to collect search terms (e.g., the search term(s) 1210 of FIG. 12). In the illustrated example, the example process of FIG. 5 is performed at the mobile device 106. However, the example process of FIG. 5 may be performed at any other device.

Initially, the data collector 112 (FIG. 1) determines whether it should collect data (block 502). For example, the app program 116 (FIG. 1) may trigger the data collector 112 to collect data when the app program 116 presents media (e.g., the media 118 of FIG. 1) or receives one or more search term(s) (e.g., the search term(s) 1210 of FIGS. 12-14). When the data collector 112 determines at block 502 that it should collect data, the data collector 112 retrieves the media ID 122 from the media 118, and/or the search term(s) 1210 (block 504). The data collector 112 also collects one or more of the device/user identifier(s) 124 from the mobile device 106 (block 506). The data collector 112 locates the media ID 122, and/or the search term(s) 1210, and the device/user identifier(s) 124 in a collected data message (e.g., the collected data 126 of FIG. 1 and/or the collected data 1214 of FIG. 12) (block 508). The data collector 112 sends the media ID 122, and/or the search term(s) 1210, and the device/user identifier(s) 124 to a collection entity (block 510). For example, the data collector 112 sends the media ID 122, and/or the search term(s) 1210, and the device/user identifier(s) 124 as the collected data 126 (FIG. 1) and/or 1214 (FIG. 12) to the apps publisher 110 of FIG. 1. The example process of FIG. 5 then ends.

In some examples in which the encryptor 202 of FIG. 2 is provided in the data collector 112, the encryptor 202 encrypts the device/user identifier(s) 124 at block 508 to generate one or more of the encrypted device/user identifier(s) 208a-i of FIG. 2. In such some examples, the data collector 112 locates the encrypted device/user identifier(s) 208a-i and the media ID 122, and/or the search term(s) 1210, in the collected data 126 and/or 1214 at block 508. In some examples in which the encoder 204 is also provided in the data collector 112, the encoder 204 generates the ACR ID 128 of FIGS. 1-4 by encoding the encrypted device/user identifier(s) 208a-i into the ACR ID 128 at block 508. In such some examples, the data collector 112 locates the ACR ID 128 and the media ID 122, and/or the search term(s) 1210, in the collected data 126 and/or 1214 at block 508. An example process that may be used to encrypt the device/user identifier(s) 124 and encode the encrypted device/user identifiers 208a-i is described below in connection with FIG. 6.

Figure 11:
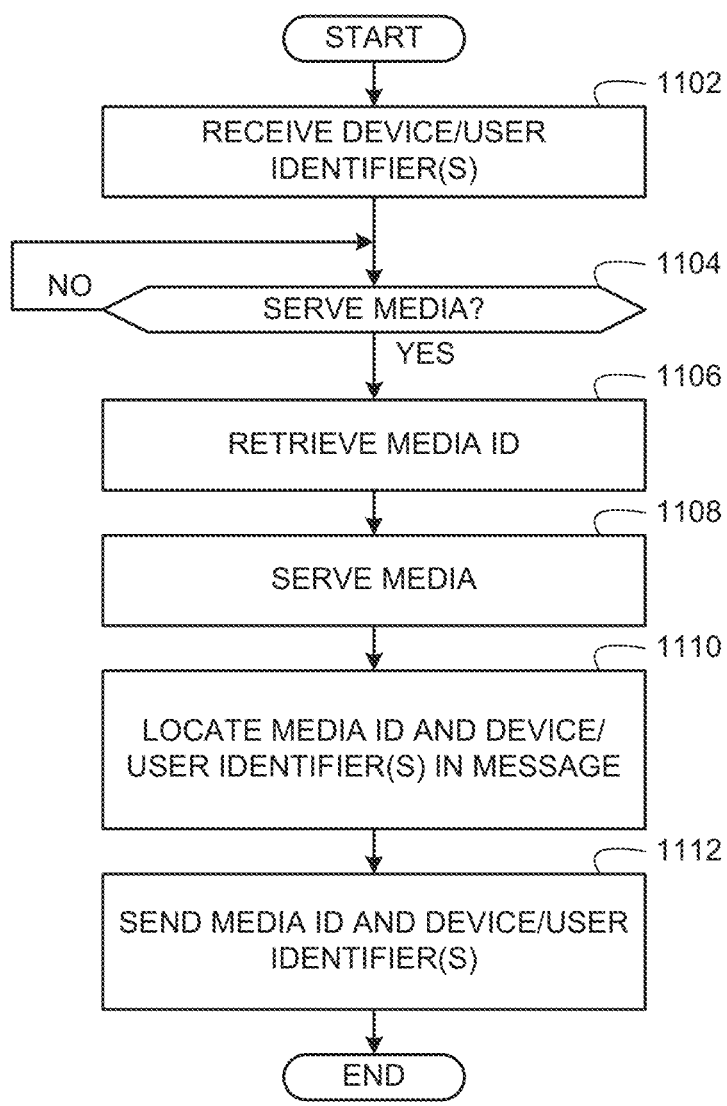
FIG. 11 is a flow diagram representative of example machine readable instructions that may be executed to collect media identifiers and device and/or user identifiers at a media publisher.

FIG. 11 is a flow diagram of an example process that may be used to collect media identifiers (e.g., the media ID 122 of FIGS. 1, 9, and 10) and device and/or user identifiers (e.g., the device/user identifier(s) 124 of FIGS. 1, 9, and 10) at a media publisher (e.g., the media publisher 120 of FIGS. 1, 9, and 10). In the illustrated example, the example process of FIG. 11 is performed by a processor system (e.g., a server) at the media publisher 120 in connection with the example system 900 of FIG. 9 and/or the example system 1000 of FIG. 10. However, the example process of FIG. 11 may be performed by any other device.

Initially, the media publisher 120 receives the device/user identifier(s) 124 (block 1102) from, for example, the data collector 912 of FIG. 9 or the data collector 1012 of FIG. 10. For example, the media publisher 120 may receive the device/user identifier(s) 124 in an HTTP header of an HTTP request from the mobile device 106. The media publisher 120 determines whether it should serve media (e.g., the media 118 of FIGS. 9 and 10) (block 1104) to, for example, the mobile device 106. For example, the media publisher 120 may receive a media serve request from the mobile device 106 that was generated by the app program 116 when executing on the mobile device 106. In the illustrated example, the media serve request is a request to serve an advertisement or other media to the mobile device 106 for presenting while the app program 116 is executing. In some examples, the media serve request is received at block 1102 when the media publisher 120 receives the device/user identifier(s) 124. For example, media publisher 120 may receive the media serve request from the mobile device 106 in the HTTP request that includes the device/user identifier(s) 124 in its HTTP header.

When the media publisher 120 determines at block 1104 that it should serve media (e.g., the media 118), the media publisher 120 retrieves the media ID 122 from the media 118 to be served (block 1106). The media publisher 120 serves the media 118 (block 1108). For example, the media publisher 120 may use one or more of the device/user identifier(s) 124 received at block 1102 to identify the mobile device 106 as a receiving device of the served media 118. The media publisher 120 locates the media ID 122 and the device/user identifier(s) 124 in a message (block 1110). For example, in the example system 900 of FIG. 9, the media publisher 120 locates the media ID 122 and the device/user identifier(s) 124 in the collected data message 902. Alternatively, in the example system 1000 of FIG. 10 in which the apparatus 200 of FIG. 2 is implemented at the media publisher 120, the media publisher 120 generates the ACR ID 128 (FIGS. 10 and 2) based on the device/user identifier(s) 124, and locates the media ID 122 and the ACR ID 128 in the impression data 130 at block 1110. The media publisher 120 sends the media ID 122 and the device/user identifier(s) 124 (block 1112), for example, as the collected data 902 to the app publisher 110 as shown in FIG. 9, or as the impression data 130 to the AME 108 as shown in FIG. 10. The example process of FIG. 11 then ends.

Figure 15:
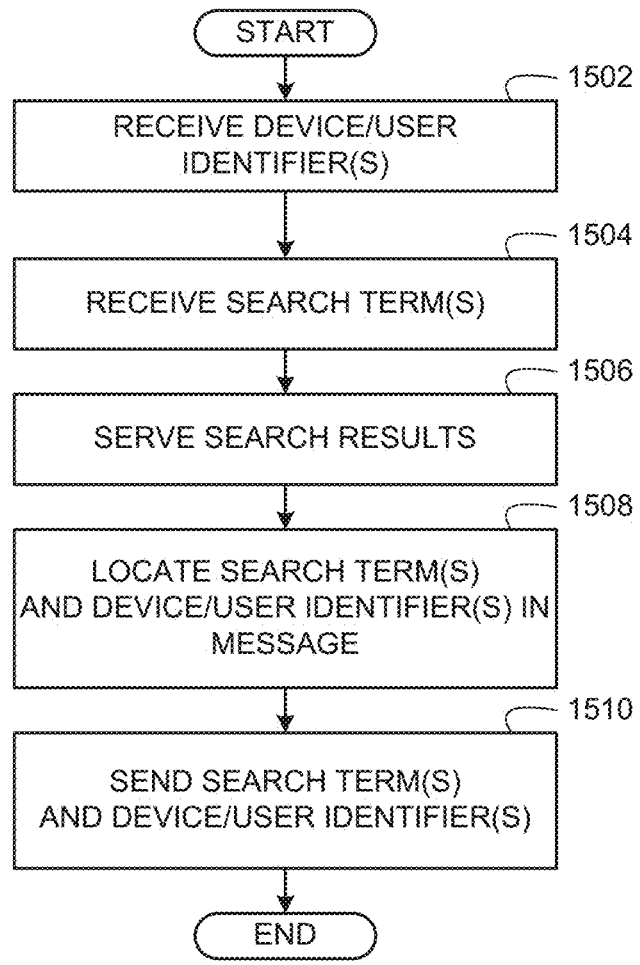
FIG. 15 is a flow diagram representative of example machine readable instructions that may be executed to collect search terms and device and/or user identifiers at a search provider.

FIG. 15 is a flow diagram of an example process that may be executed to collect search terms (e.g., the search term(s) 1210 of FIGS. 12-14) and device and/or user identifiers (e.g., the device/user identifiers 124 of FIGS. 12-14) at a search provider (e.g., the search provider 1212 of FIGS. 12-14). In the illustrated example, the example process of FIG. 15 is performed by a processor system (e.g., a server) at the search provider 1212 in connection with the example system 1300 of FIG. 13 and/or the example system 1400 of FIG. 14. However, the example process of FIG. 15 may be performed by any other device.

Initially, the search provider 1212 receives the device/user identifier(s) 124 (block 1502) from, for example, the data collector 1312 of FIG. 13 or the data collector 1412 of FIG. 14. For example, the search provider 1212 may receive the device/user identifier(s) 124 in an HTTP header of an HTTP request from the mobile device 106. The search provider 1212 receives the search term (s) 1210 from the app program 1204 (block 1504). The search provider 1212 serves search results 1506 (block 1506). For example, the search provider 1212 may use one or more of the device/user identifier(s) 124 received at block 1502 to identify the mobile device 106 as a receiving device of the search results. The search provider 1212 locates the search term(s) 1210 and the device/user identifier(s) 124 in a message (block 1508). For example, in the example system 1300 of FIG. 13, the search provider 1212 locates the search term(s) 1210 and the device/user identifier(s) 124 in the collected data message 1302. Alternatively, in the example system 1400 of FIG. 14 in which the apparatus 200 of FIG. 2 is implemented at the search provider 1212, the search provider 1212 generates the ACR ID 128 (FIGS. 14 and 2) based on the device/user identifier(s) 124, and locates the search term(s) 1210 and the ACR ID 128 in the user-interest data 1216 at block 1508. The search provider 1212 sends the search term(s) 1210 and the device/user identifier(s) 124 (block 1510), for example, as the collected data 1302 to the app publisher 110 as shown in FIG. 13, or as the user-interest data 1216 to the AME 108 as shown in FIG. 14. The example process of FIG. 15 then ends.

Figure 6:
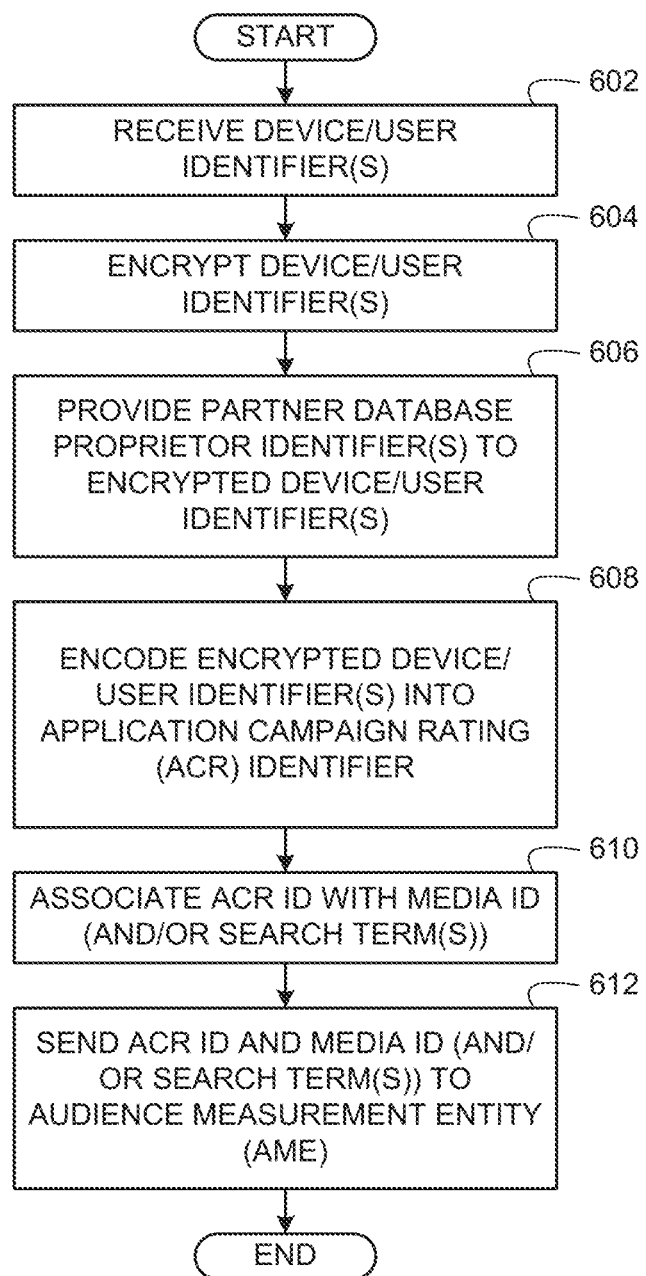
FIG. 6 is a flow diagram representative of example machine readable instructions that may be executed to encrypt device and/or user identifiers, and encode the encrypted device and/or user identifiers into the ACR identifier of FIG. 2.

FIG. 6 is a flow diagram of an example process to encrypt device and/or user identifiers (e.g., the device/user identifier(s) 124 of FIGS. 1 and 2), and to encode encrypted device and/or user identifiers (e.g., the encrypted device/user identifier(s) 208*a-i* of FIGS. 2-4) into the ACR ID 128 of FIGS. 1-4. The example process of FIG. 6 may be performed wholly or partially at the app publisher 110 of FIGS. 1, 9, and 10 (or another collection entity), wholly or partially at the mobile device 106 (e.g., at block 508 of the example process of FIG. 5), wholly or partially at the media publisher 120 of FIGS. 1, 9, and 10, and/or wholly or partially at the search provider 1212 of FIGS. 12-14. In some examples, operations performed by the encryptor 202 (FIG. 2) may be performed at the mobile device 106, and operations performed by the encoder 204 (FIG. 2) may be performed at the app publisher 110, at the media publisher 120, and/or at the search provider 1212.

Initially, the encryptor 202 (FIG. 2) receives one or more of the device/user identifier(s) 124 (FIGS. 1 and 2) (block 602). The encryptor 202 encrypts the device/user identifier(s) 124 (block 604) to generate the encrypted device/user identifier(s) 208*a-i* (FIG. 2). In the illustrated example, the encryptor 202 provides corresponding partner database proprietor identifiers to corresponding ones of the encrypted device/user identifier(s) 208*a-i* (block 606), for example, by appending, prepending, concatenating, or otherwise associating the partner database proprietor identifiers to or with the encrypted device/user identifier(s) 208*a-i* so that the partner database proprietor identifiers are accessible to the AME 108 without decrypting the encrypted device/user identifier(s) 208*a-i*. The encoder 204 (FIG. 2) encodes the encrypted device/user identifier(s) 208*a-i* into the ACR ID 128 (block 608). In the illustrated example, the encoder 204 associates the ACR ID 128 with the corresponding media ID 122, and/or the search term(s) 1210 (block 610). The encoder 204 sends the ACR ID 128 and the media ID 122, and/or the search term(s) 1210, to the AME 108 (block 612), for example, in the impression data 130 (FIGS. 1, 9, and 10). In some examples, the media ID 112 and/or the search term(s) 1210 are encrypted prior to transmission. The example process of FIG. 6 then ends.

Figure 7:
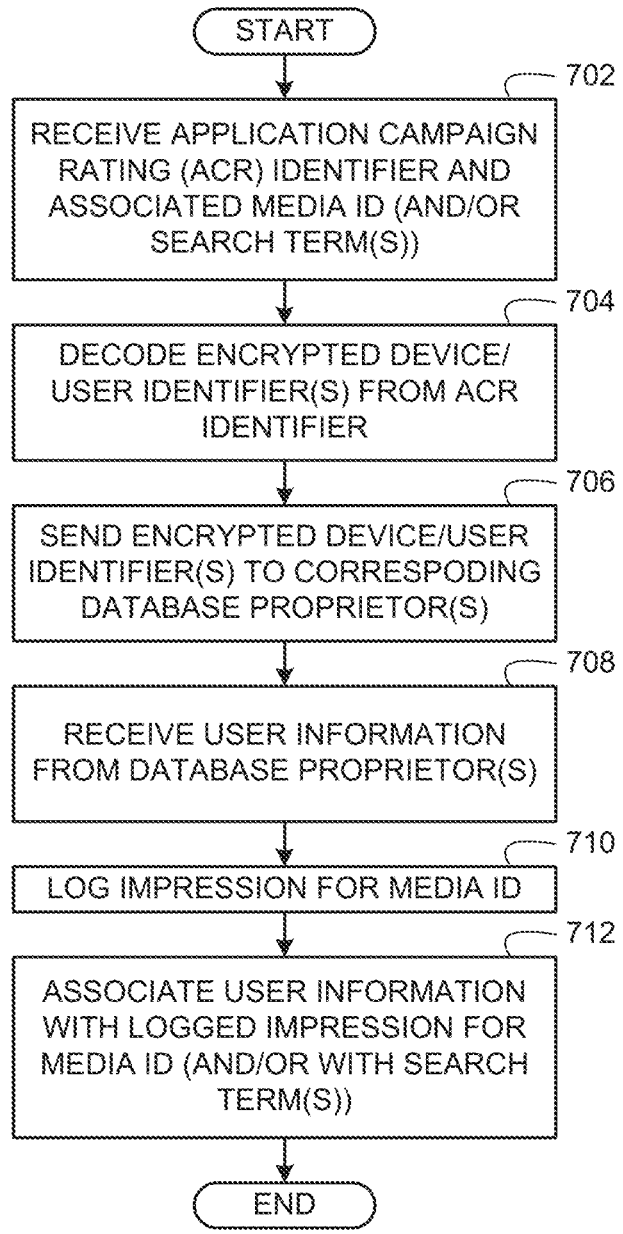
FIG. 7 is a flow diagram representative of example machine readable instructions that may be executed to decode encrypted device and/or user identifiers from the ACR identifier of FIG. 2, and collect user information associated with the encrypted device and/or user identifiers from corresponding database proprietors.

FIG. 7 is a flow diagram of an example process that may be used to decode encrypted device and/or user identifiers (e.g., the encrypted device/user identifiers 208*a-i* of FIGS. 2-4) from the ACR ID 128 of FIGS. 1-4, and collect user information associated with the encrypted device and/or user identifiers from one or more corresponding partner database proprietor(s) (e.g., one or more of the partner database proprietors 102*a-e* of FIGS. 1, 3, and 4). The example process of FIG. 7 may be performed at the AME 108 (FIG. 1), for example, by the server 132 (FIG. 1).

Initially, the server 132 receives the ACR ID 128 and the associated media ID 122, and/or the search term(s) 1210 (block 702). For example, the server 132 may receive the ACR ID 128 and the media ID 122 in the impression data 130 from the app publisher 110, from the media publisher 120, and/or from the mobile device 106 of FIGS. 1, 9, and 10. Additionally or alternatively, the server 132 may receive the ACR ID 128 and the search term(s) 1210 in the user-interest data 1216 from the app publisher 110, from the search provider 1212, and/or from the mobile device 106 of FIGS. 12-14. The decoder 302 (FIGS. 3 and 4) decodes one or more of the encrypted device/user identifier(s) 208*a-i* from the ACR ID 128 (block 704). The decoder 302 sends corresponding ones of the encrypted device/user identifier(s) 208*a-i* to corresponding ones of the partner database proprietor(s) 102*a-e* (block 706), for example, based on partner database proprietor identifiers provided to or associated with the encrypted device/user identifiers 208*a-i* by the encryptor 202 of FIG. 2 at block 606 of FIG. 6. The server 132 receives one or more of the user information 102*a-e* from one or more of the partner database proprietor(s) 102*a-e* (block 708). The server 132 logs a media impression for the media ID 122 (block 710). In addition, the server 132 associates the user information from at least one of the one or more user information 102*a-e* with the logged impression for the media ID 122, and/or with the search term(s) 1210 (block 712). The example process of FIG. 7 then ends.

Figure 8:
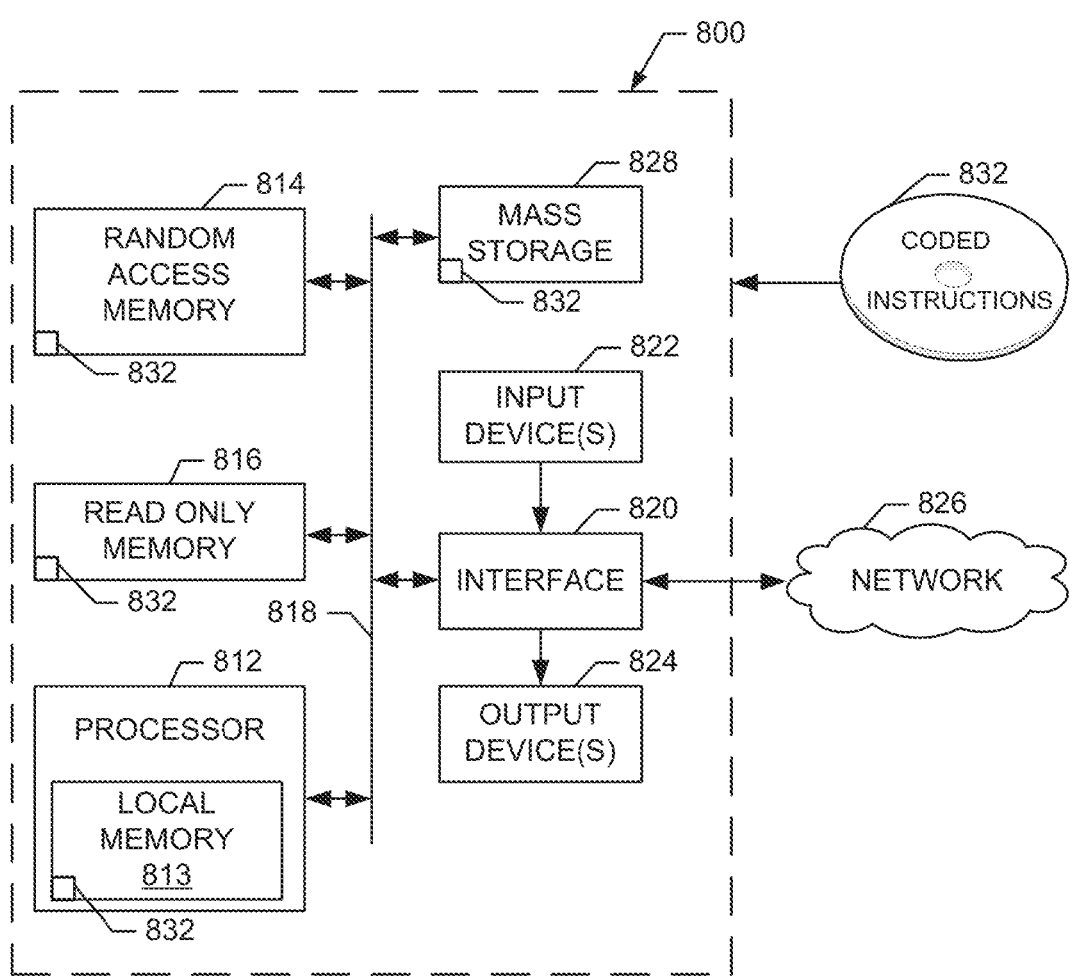
FIG. 8 is an example processor system that may be used to execute the example instructions of FIGS. 5-7, 11, and 15 to implement example apparatus and systems disclosed herein.

FIG. 8 is a block diagram of an example computer 800 capable of executing the instructions of FIGS. 5-7, 11, and 15. The computer 800 can be, for example, a server, a personal computer, or any other type of computing device. The system 800 of the illustrated example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The computer 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The computer 800 also includes one or more mass storage devices 828 for storing software and data. Examples of such mass storage devices 828 include floppy disk drives, hard drive disks, compact disk drives and digital versatile disk (DVD) drives.

Coded instructions 832 representative of machine readable instructions of FIGS. 5-7, 11, and 15 may be stored in the mass storage device 828, in the volatile memory 814, in the non-volatile memory 816, and/or on a removable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   obtaining, at a server, encrypted identifiers identifying at least one of a device or a user of the device, the device being separate from the server;
   sending, from the server, respective ones of the encrypted identifiers to corresponding database proprietors;
   receiving, at the server, user information corresponding to the respective ones of the encrypted identifiers from the corresponding database proprietors; and
   associating the user information with at least one of a search term collected at the device or a media impression logged for media presented at the device.

2. The method as defined in claim 1, wherein the associating of the user information with the at least one of the search term or the media impression is performed at the server.

3. The method as defined in claim 1, further including decoding information from the device to obtain the respective ones of the encrypted identifiers.

4. A method comprising:
   obtaining encrypted identifiers identifying at least one of a device or a user of the device;
   sending respective ones of the encrypted identifiers to corresponding database proprietors, the database proprietors including a social network service and a wireless service provider, a first one of the encrypted identifiers including a username of the user registered with the social network service, and a second one of the encrypted identifiers including a device identifier used by the wireless service provider to identify the device;
   receiving user information corresponding to the respective ones of the encrypted identifiers from the corresponding database proprietors; and
   associating the user information with at least one of a search term collected at the device or a media impression logged for media presented at the device.

5. The method as defined in claim 4, wherein the user information includes first demographic information of the user stored by the social network service, and second demographic information of the user stored by the wireless service provider.

6. A method comprising:
   obtaining encrypted identifiers identifying at least one of a device or a user of the device;
   sending respective ones of the encrypted identifiers to corresponding database proprietors;
   receiving user information corresponding to the respective ones of the encrypted identifiers from the corresponding database proprietors; and
   associating the user information with at least one of a search term collected at the device or a media impression logged for media presented at the device, the media is an advertisement, and the search term corresponds to a search performed at the device to at least one of search information on the Internet, search for a product, search for a website, or search a website.

7. The method as defined in claim 1, further including sending the encrypted identifiers to the corresponding database proprietors based on respective database proprietor identifiers received in association with corresponding ones of the encrypted identifiers, the respective database proprietor identifiers identifying corresponding ones of the database proprietors.

8. The method as defined in claim 1, wherein the device is a mobile device.

9. The method as defined in claim 1, wherein the encrypted identifiers are received in a single network communication.

10. An apparatus comprising:
    a memory including machine executable instructions; and
    a processor to execute the instructions to:
      obtain encrypted identifiers identifying at least one of a device or a user of the device, the device being separate from the processor;
      send respective ones of the encrypted identifiers to corresponding database proprietors;
      receive user information corresponding to the respective ones of the encrypted identifiers from the corresponding database proprietors; and
      associate the user information with at least one of a search term collected at the device or a media impression logged for media presented at the device.

11. The apparatus as defined in claim 10, wherein the processor is located in a server separate from the device and in communication with the device.

12. An apparatus comprising:
    a memory including machine executable instructions; and
    a processor to execute the instructions to:
      obtain encrypted identifiers identifying at least one of a device or a user of the device;
      send respective ones of the encrypted identifiers to corresponding database proprietors, the database proprietors including a social network service and a wireless service provider, a first one of the encrypted identifiers including a username of the user registered with the social network service, and a second one of the encrypted identifiers including a device identifier used by the wireless service provider to identify the device;
      receive user information corresponding to the respective ones of the encrypted identifiers from the corresponding database proprietors; and
      associate the user information with at least one of a search term collected at the device or a media impression logged for media presented at the device.

13. The apparatus as defined in claim 12, wherein the user information includes first demographic information of the user stored by the social network service, and second demographic information of the user stored by the wireless service provider.

14. An apparatus comprising:
    a memory including machine executable instructions; and
    a processor to execute the instructions to:
      obtain encrypted identifiers identifying at least one of a device or a user of the device;
      send respective ones of the encrypted identifiers to corresponding database proprietors;
      receive user information corresponding to the respective ones of the encrypted identifiers from the corresponding database proprietors; and associate the user information with at least one of a search term collected at the device or a media impression logged for media presented at the device, the media is an advertisement, and the search term corresponds to a search performed at the device to at least one of search information on the Internet, search for a product, search for a website, or search a website.

15. The apparatus as defined in claim 10, wherein the processor is to execute the instructions to send the encrypted identifiers to the corresponding database proprietors based on respective database proprietor identifiers received in association with corresponding ones of the encrypted identifiers, the respective database proprietor identifiers identifying corresponding ones of the database proprietors.

16. The apparatus as defined in claim 10, wherein the encrypted identifiers are received in a single network communication.

17. A tangible machine readable storage medium comprising instructions that, when executed, cause a machine to at least:
    obtain encrypted identifiers identifying at least one of a device or a user of the device, the machine being separate from the device;
    send respective ones of the encrypted identifiers to corresponding database proprietors;
    receive user information corresponding to the respective ones of the encrypted identifiers from the corresponding database proprietors; and
    associate the user information with at least one of a search term collected at the device or a media impression logged for media presented at the device.

18. The tangible machine readable storage medium as defined in claim 17, wherein the machine is a server separate from the device and in communication with the device.

19. A tangible machine readable storage medium comprising instructions that, when executed, cause a machine to at least:
    obtain encrypted identifiers identifying at least one of a device or a user of the device;
    send respective ones of the encrypted identifiers to corresponding database proprietors, the database proprietors including a social network service and a wireless service provider, a first one of the encrypted identifiers including a username of the user registered with the social network service, and a second one of the encrypted identifiers including a device identifier used by the wireless service provider to identify the device;
    receive user information corresponding to the respective ones of the encrypted identifiers from the corresponding database proprietors; and
    associate the user information with at least one of a search term collected at the device or a social media impression logged for media presented at the device.

20. The tangible machine readable storage medium as defined in claim 19, wherein the user information includes first demographic information of the user stored by the social network service, and second demographic information of the user stored by the wireless service provider.

21. A tangible machine readable storage medium comprising instructions that, when executed, cause a machine to at least:
    obtain encrypted identifiers identifying at least one of a device or a user of the device;
    send respective ones of the encrypted identifiers to corresponding database proprietors;
    receive user information corresponding to the respective ones of the encrypted identifiers from the corresponding database proprietors; and
    associate the user information with at least one of a search term collected at the device or a media impression logged for media presented at the device, the media is an advertisement, and the search term corresponds to a search performed at the device to at least one of search information on the Internet, search for a product, search for a website, or search a website.

22. The tangible machine readable storage medium as defined in claim 17, wherein the instructions cause the machine to send the encrypted identifiers to the corresponding database proprietors based on respective database proprietor identifiers received in association with corresponding ones of the encrypted identifiers, the respective database proprietor identifiers identifying corresponding ones of the database proprietors.

23. The tangible machine readable storage medium as defined in claim 17, wherein the encrypted identifiers are received in a single network communication.

* * * * *